United States Patent
Pechner et al.

(10) Patent No.: US 7,154,914 B1
(45) Date of Patent: Dec. 26, 2006

(54) THROUGH-TIMING OF DATA TRANSMITTED ACROSS AN OPTICAL COMMUNICATIONS SYSTEM UTILIZING FREQUENCY DIVISION MULTIPLEXING

(75) Inventors: David A Pechner, San Jose, CA (US); Laurence J Newell, Saratoga, CA (US); Mark D Konezny, Gilroy, CA (US)

(73) Assignee: Forster Energy LLC, Las Vegas, NV (US)

( * ) Notice: Subject to any disclaimer, the term of this patent is extended or adjusted under 35 U.S.C. 154(b) by 803 days.

(21) Appl. No.: 09/816,242

(22) Filed: Mar. 23, 2001

Related U.S. Application Data

(63) Continuation-in-part of application No. 09/571,349, filed on May 16, 2000, now abandoned, which is a continuation-in-part of application No. 09/405,367, filed on Sep. 24, 1999, now Pat. No. 6,529,303, which is a continuation-in-part of application No. 09/372,143, filed on Aug. 20, 1999, now abandoned, which is a continuation-in-part of application No. 09/229,594, filed on Jan. 13, 1999, now Pat. No. 6,452,945, which is a continuation-in-part of application No. 09/035,630, filed on Mar. 5, 1998, now abandoned.

(51) Int. Cl.
 H04J 3/06 (2006.01)
 H04J 3/04 (2006.01)
 H04J 3/02 (2006.01)

(52) U.S. Cl. .................. 370/516; 370/535; 370/541
(58) Field of Classification Search ............... 370/478, 370/480, 484, 485, 503, 516–518, 535–544, 370/389, 474; 398/79, 83, 91
See application file for complete search history.

(56) References Cited

U.S. PATENT DOCUMENTS

| | | | |
|---|---|---|---|
| 4,061,577 A | 12/1977 | Bell | ............................ 250/199 |
| 4,210,779 A | 7/1980 | Simokat | |
| 4,701,904 A | 10/1987 | Darcie | ............................ 370/3 |
| 4,704,715 A * | 11/1987 | Shibagaki et al. | .......... 370/307 |
| 4,768,186 A | 8/1988 | Bodell | |
| 4,800,555 A | 1/1989 | Foschini | |

(Continued)

FOREIGN PATENT DOCUMENTS

EP  0 717 521 A  6/1996

*Primary Examiner*—Huy D. Vu
*Assistant Examiner*—Daniel Ryman

(57) ABSTRACT

Data is transmitted across an optical fiber communications system by splitting an incoming tributary into multiple low-speed data channels, modulating each of these into a stream of symbols (e.g., by using QAM modulation) and then frequency division multiplexing a number of symbol streams into a single high-speed channel to be transmitted across a fiber. The receiver reverses this process. In order to preserve the jitter tolerance for the overal system, reference clocks are used to remove unwanted jitter in the timing of the system.

33 Claims, 13 Drawing Sheets

U.S. PATENT DOCUMENTS

| | | | |
|---|---|---|---|
| 4,953,156 A | 8/1990 | Olshansky et al. | 370/3 |
| 5,001,711 A * | 3/1991 | Obana et al. | 370/535 |
| 5,060,310 A | 10/1991 | Frisch et al. | |
| 5,339,184 A | 8/1994 | Tang | |
| 5,351,148 A | 9/1994 | Maeda et al. | 359/124 |
| 5,387,927 A | 2/1995 | Look et al. | 348/6 |
| 5,430,568 A | 7/1995 | Little et al. | 359/124 |
| 5,459,607 A | 10/1995 | Fellows et al. | |
| 5,461,612 A | 10/1995 | Göckler et al. | 370/55 |
| 5,559,561 A | 9/1996 | Wei | 348/470 |
| 5,576,874 A | 11/1996 | Czerwiec et al. | 359/123 |
| 5,596,436 A | 1/1997 | Sargis et al. | 359/132 |
| 5,610,748 A | 3/1997 | Sakanaka et al. | |
| 5,678,198 A | 10/1997 | Lemson | |
| 5,680,238 A | 10/1997 | Masuda | 359/132 |
| 5,832,387 A | 11/1998 | Bae et al. | |
| 5,878,088 A | 3/1999 | Knutson et al. | 375/324 |
| 5,938,309 A * | 8/1999 | Taylor | 398/79 |
| 6,041,062 A * | 3/2000 | Yamato et al. | 370/465 |
| 6,055,242 A * | 4/2000 | Doshi et al. | 370/458 |
| 6,078,412 A | 6/2000 | Fuse et al. | 359/124 |
| 6,160,649 A | 12/2000 | Horiuchi et al. | |
| 6,236,726 B1 | 5/2001 | Darveau | |
| 6,271,942 B1 | 8/2001 | Sasai et al. | |
| 6,289,511 B1 | 9/2001 | Hubinette | |
| 6,430,148 B1 | 8/2002 | Ring | |
| 6,529,303 B1 | 3/2003 | Rowan et al. | |
| 6,603,822 B1 | 8/2003 | Brede et al. | |
| 6,643,470 B1 | 11/2003 | Iida et al. | |

* cited by examiner

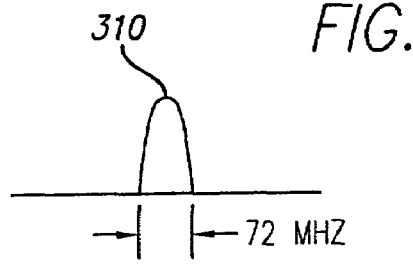
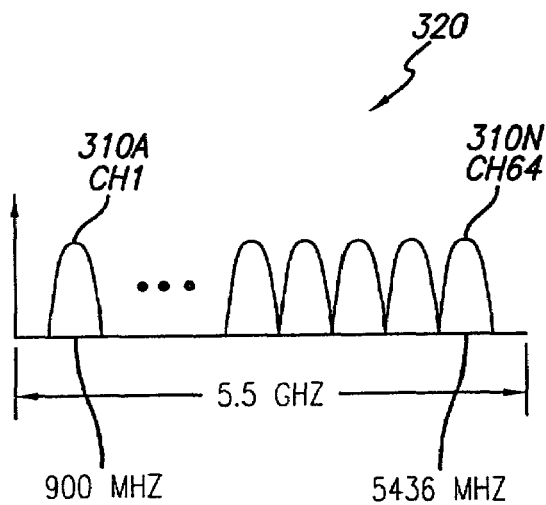
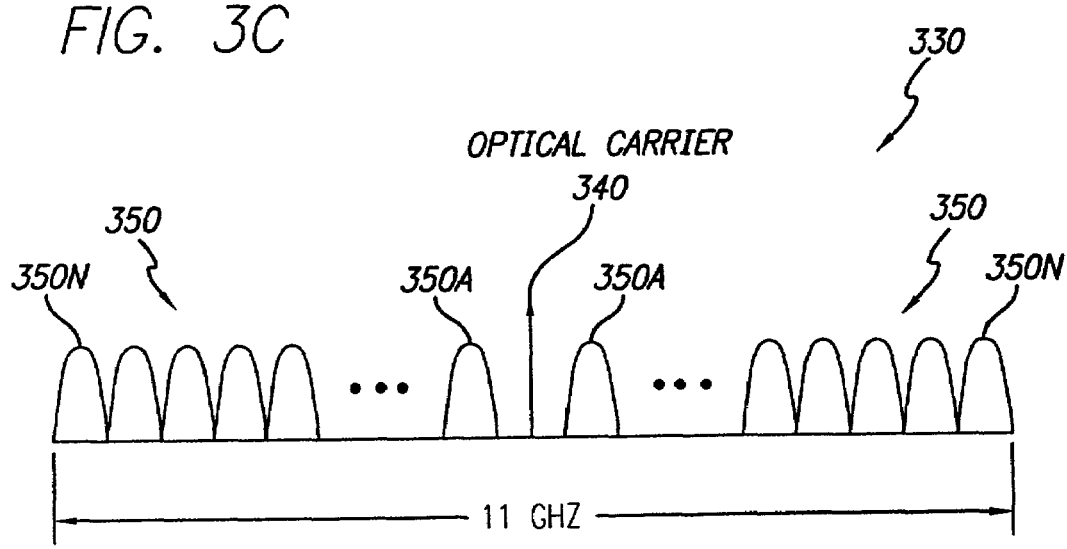

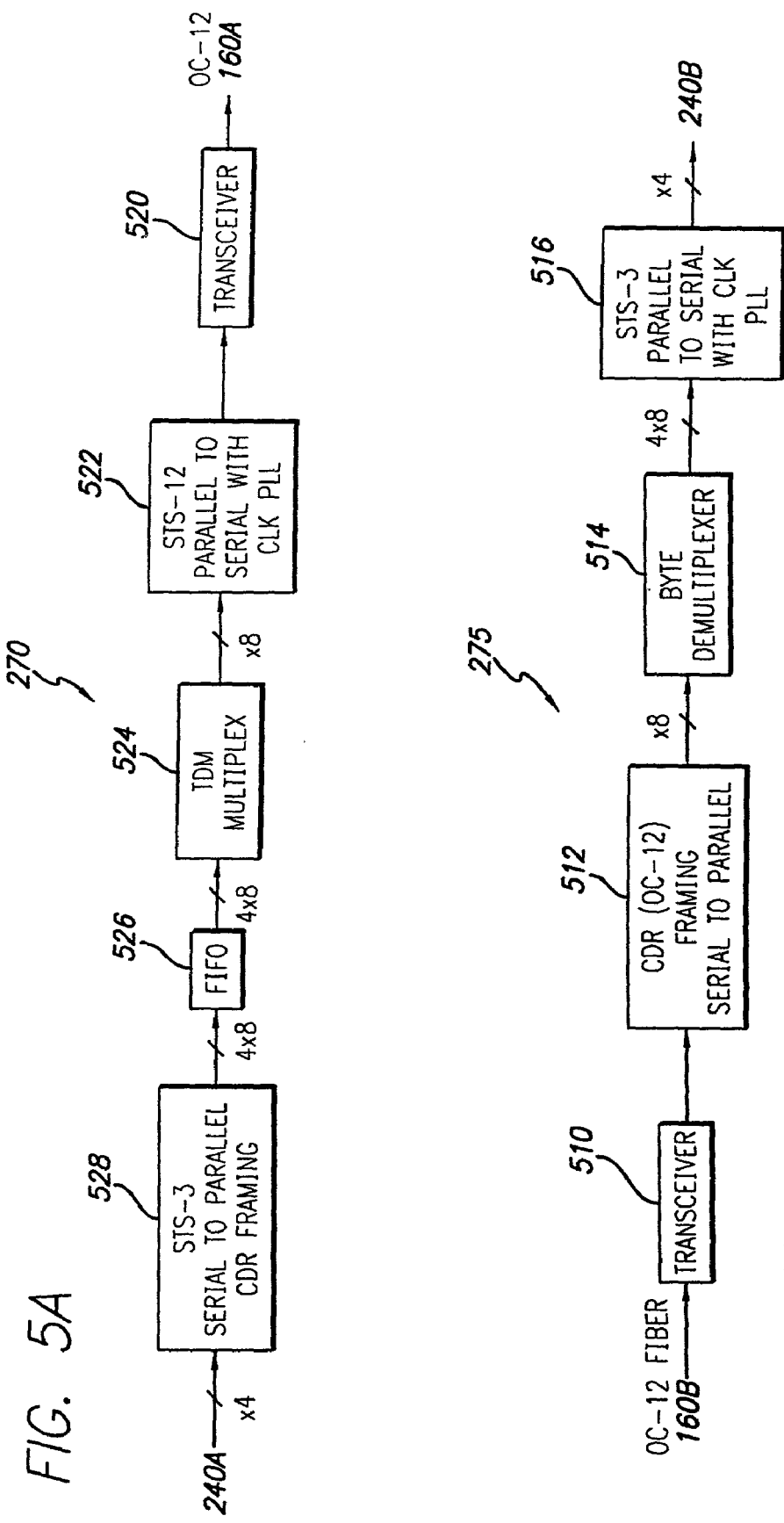

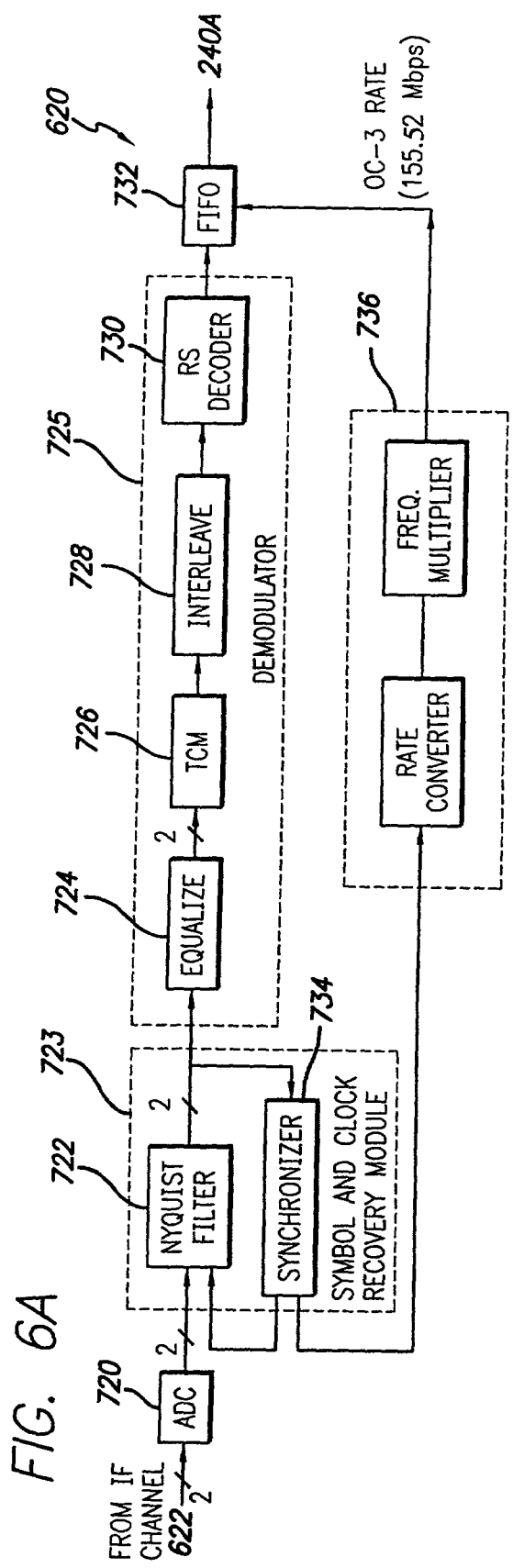
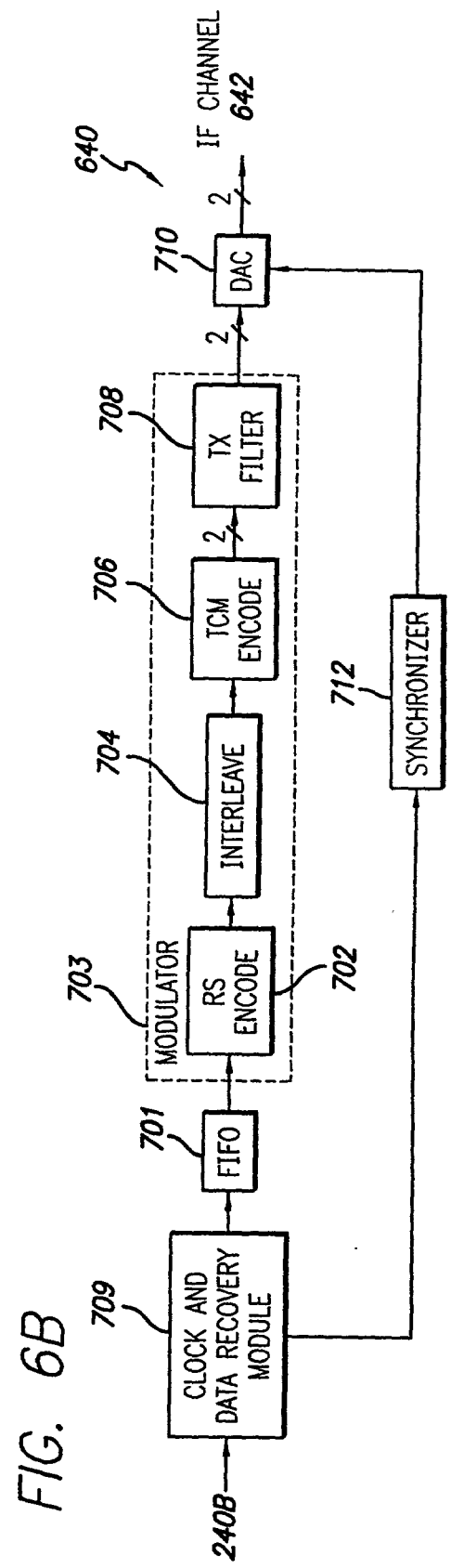
FIG. 6A
FIG. 6B

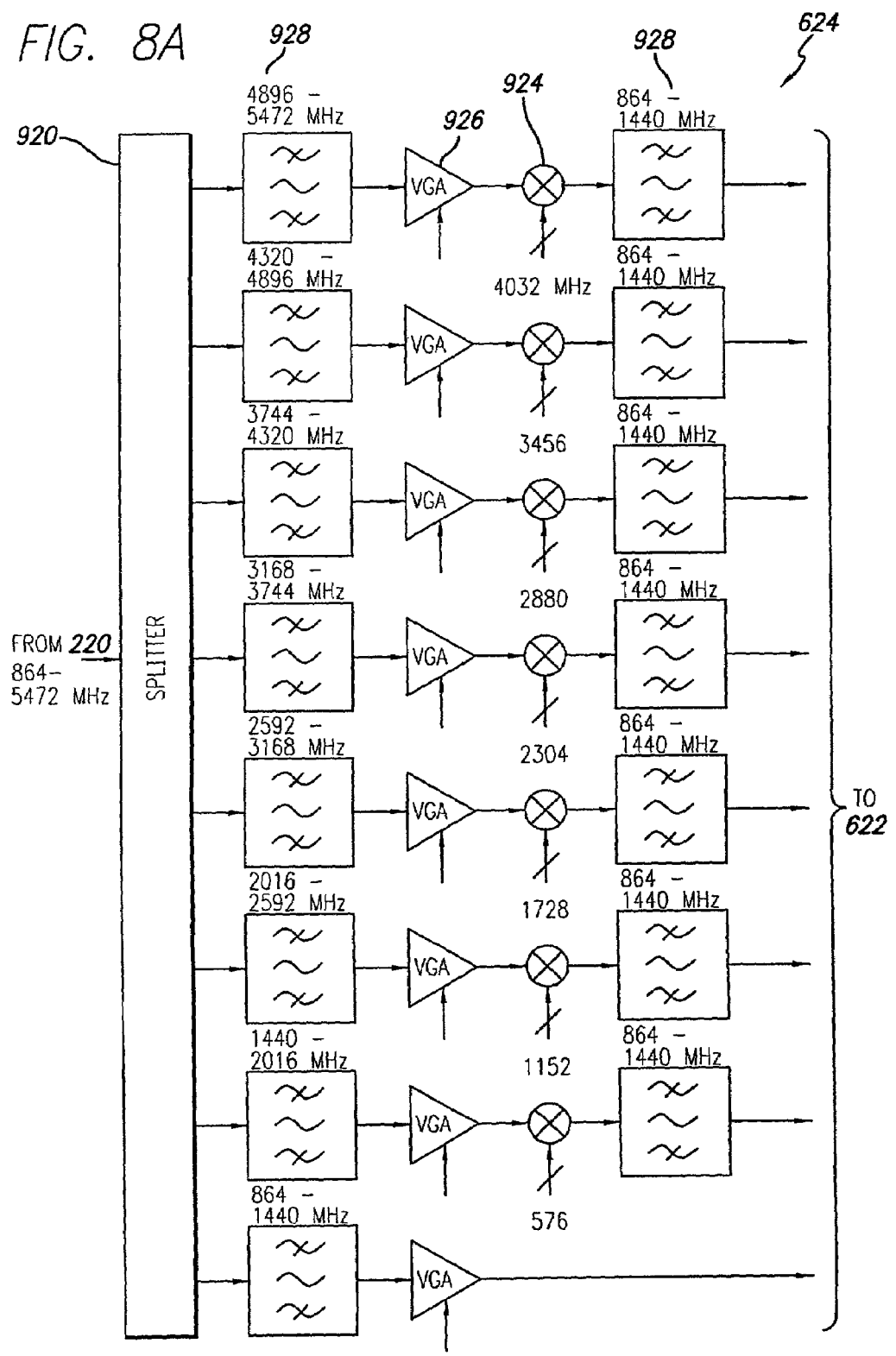

THROUGH-TIMING OF DATA TRANSMITTED ACROSS AN OPTICAL COMMUNICATIONS SYSTEM UTILIZING FREQUENCY DIVISION MULTIPLEXING

CROSS-REFERENCE TO RELATED APPLICATIONS

This application is a continuation-in-part of U.S. patent application Ser. No. 09/571,349, filed May 16, 2000, now abandoned, which is a continuation-in-part of U.S. patent application Ser. No. 09/405,367, filed Sep. 24, 1999, now U.S. Pat. No. 6,529,303; which is a continuation-in-part of U.S. patent application Ser. No. 09/372,143, filed Aug. 20, 1999, now abandoned; which is a continuation-in-part of U.S. patent application Ser. No. 09/229,594, filed Jan. 13, 1999, now U.S. Pat. No. 6,452,594; which is a continuation-in-part of U.S. patent application Ser. No. 09/035,630, filed Mar. 5, 1998, now abandoned. The subject matter of all of the foregoing is incorporated herein by reference.

BACKGROUND OF THE INVENTION

1. Field of the Invention

This invention relates generally to optical fiber communications systems which use frequency division multiplexing, and more particularly, to maintaining the timing of data transmitted across such communications systems.

2. Description of the Related Art

As the result of continuous advances in technology, particularly in the area of networking, there is an increasing demand for communications bandwidth. For example, the growth of the Internet, home office usage, e-commerce and other broadband services is creating an ever-increasing demand for communications bandwidth. Upcoming widespread deployment of new bandwidth-intensive services, such as xDSL, will only further intensify this demand. Moreover, as data-intensive applications proliferate and data rates for local area networks increase, businesses will also demand higher speed connectivity to the wide area network (WAN) in order to support virtual private networks and high-speed Internet access. Enterprises that currently access the WAN through T1 circuits will require DS-3, OC-3, or equivalent connections in the near future. As a result, the networking infrastructure will be required to accommodate greatly increased traffic.

Optical fiber is a transmission medium that is well suited to meet this increasing demand. Optical fiber has an inherent bandwidth which is much greater than metal-based conductors, such as twisted pair or coaxial cable. There is a significant installed base of optical fibers and protocols such as SONET have been developed for the transmission of data over optical fibers. Typical communications system based on optical fibers include a transmitter, an optical fiber, and a receiver. The transmitter converts the data to be communicated into an optical form and transmits the resulting optical signal across the optical fiber to the receiver. The receiver recovers the original data from the received optical signal. Recent advances in transmitter and receiver technology have also resulted in improvements, such as increased bandwidth utilization, lower cost systems, and more reliable service.

Because of its large inherent bandwidth, an optical fiber is most efficiently used when multiple users share the fiber. Typically, a number of low-speed data streams (i.e., "low-speed channels"), for example transmitted by different users, are combined into a single high-speed channel for transport across the fiber. Conversely, when the high-speed channel reaches the destination for one of the low-speed channels contained within it, the low-speed channel is extracted from the rest of the high-speed channel. For certain applications, it may also be desirable or even required that the original timing of the low-speed channel be maintained when the low-speed channel is extracted from the corresponding high-speed channel. Alternately, there may be requirements on the maximum amount of timing jitter introduced and/or propagated by the overall transmission process. Tight jitter tolerances are beneficial since excessive timing jitter can significantly degrade the performance of the network. For example, if each data bit is expected during a certain timeslot, then the timeslot must be large enough to accommodate any jitter introduced by transmission over the network. Loose jitter tolerances will result in longer timeslots required for each bit which, in turn, will mean lower data transmission rates.

As one example, a network may be made up of a number of nodes connected to each other by optical fiber links. Data transmitted over the network may travel from node to node over several links before reaching its final destination. Jitter tolerances in such a network may be specified on a per-link basis so that end-to-end jitter requirements will be met independent of the number of links traversed. In other words, the specification of proper per-link jitter tolerances allows each link to be designed independently of the others while still guaranteeing that end-to-end jitter requirements will be met so long as each link meets the appropriate tolerances. The accumulation of jitter is maintained within tolerances as data travels across the network.

The GR-253 standard (e.g., see Bellcore, Synchronous Optical Network (SONET) Transport Systems: Common Generic Criteria, Generic Requirements GR-253-CORE, Issue 2, December 1995, with Revision 2, January 1999) is one example of a standard which specifies per-link jitter timing requirements. In particular, these standards specify requirements on jitter transfer, jitter generation, and jitter tolerance. The jitter transfer requirement for a link places a maximum on the jitter at the output of the link, assuming a certain amount of jitter at the input of the link and assuming no independent jitter sources within the link. In other words, it is a requirement on the proliferation of jitter as it propagates through the link. The jitter generation requirement places a maximum on the jitter at the output of the link, assuming no jitter at the input of the link. This is a requirement on the amount of jitter generated within the link. The jitter tolerance requirement specifies how much jitter at its input a link must be able to tolerate. In other words, each link must be able to accommodate a certain amount of jitter generated by the previous link.

Whether and with what difficulty these timing requirements can be achieved will depend in part on the specific technique used to combine the low-speed channels. Two widely used approaches to combining low-speed channels are wavelength division multiplexing (WDM) and time division multiplexing (TDM).

In WDM or its more recent counterpart dense wavelength division multiplexing (DWDM), each low-speed channel is placed on an optical carrier of a different wavelength and the different wavelength carriers are combined to form the high-speed channel. Crosstalk between the low-speed channels is a major concern in WDM and, as a result, the wavelengths for the optical carriers must be spaced far enough apart (typically 50 GHz or more) so that the different low-speed channels are resolvable. As a result, the number of different optical carriers is limited and if each carrier corresponds to a low-speed channel, as is typically the case, the total number of low-speed channels is also limited. Furthermore, if the bandwidth capacity of the fiber is to be used efficiently, each low-speed channel must have a relatively high data rate due to the low number of low-speed channels. The relative complexity of the components used in WDM systems further encourages the use of high data rates for each dedicated wavelength, and hence also for each low-speed channel. For example, some current WDM systems specify data rates of 2.5 Gbps and higher for each dedicated wavelength. This typically is a drawback since, for example, many data streams occur at a much lower bit rate, such as at 155 Megabits per second (Mbps) for OC-3, and will underutilize the higher data rate specified for each dedicated wavelength.

In TDM, each low-speed channel is compressed into a certain time slot and the time slots are then combined on a time basis to form the high-speed channel. For example, in a certain period of time, the high-speed channel may be capable of transmitting 10 bits while each low-speed channel may only be capable of transmitting 1 bit. In this case, the first bit of the high-speed channel may be allocated to low-speed channel 1, the second bit to low-speed channel 2, and so on, thus forming a high-speed channel containing 10 low-speed channels. The TDM approach is strongly ratio-based and requires precise synchronization of the low-speed channels between nodes in a network. As a result, TDM systems typically require complex timing, leading to increased overall cost. In addition, since the low-speed channels typically are combined on a bit-by-bit (or byte-by-byte) basis, TDM systems are heavily dependent on the bit rates of the individual low-speed channels and have difficulty handling low-speed channels of different bit rates or different protocols. As yet another disadvantage, a TDM channel typically consists of a header in addition to the actual data to be transmitted. When ten low-speed channels are combined into a single high-speed channel at a 10× higher data rate using SONET TDM protocols, the headers for the ten low-speed channels and the resulting high-speed channel typically must be manipulated in order to accomplish the conversion and also to undo the conversion (e.g., SONET pointer processing). This manipulation of the headers is not always straightforward and, in some cases, can even prevent the combination of certain types of channels.

Thus, there is a need for an inexpensive node which efficiently combines a number of low-speed channels into a high-speed channel and which can efficiently maintain the original timing of the low-speed channels and also meet timing jitter requirements for each channel, even when the low-speed channels are incorporated as part of a high-speed channel. The node preferably operates independent of bit rate, format, and protocol of the various channels and is capable of handling a large number of low data rate low-speed channels.

SUMMARY OF THE INVENTION

In accordance with the present invention, an optical fiber communications system for maintaining jitter tolerance of data transmitted across the communications system includes a local oscillator, clock and data recovery circuitry, a time division demultiplexer, a modulator, and a frequency division multiplexer. The local oscillator provides a reference clock, preferably one that meets applicable jitter tolerances. The clock and data recovery circuitry receives an incoming tributary, recovers data from the tributary, and retimes the data according to the reference clock. The time division demultiplexer splits the recovered data into at least two low-speed data channels on a time division demultiplexing basis. Each low-speed data channel is timed by a clock based on the reference clock. The modulator modulates each low-speed data channel to generate a corresponding low-speed symbol channel. The frequency division multiplexer combines the low-speed symbol channels into an electrical high-speed channel using frequency division multiplexing techniques. The electrical high-speed channel is suitable for transmission in optical form across an optical fiber.

In a preferred embodiment, the clock and data recovery circuitry also recovers a clock from the incoming tributary. The reference clock is phase aligned to the recovered clock and the recovered data is retimed using the phase-aligned reference clock. The resulting retimed data stream is time division demultiplexed into the low-speed data channels.

In another aspect of the invention, the receive-side of the optical fiber communications system includes a frequency division demultiplexer, a demodulator, clock and data recovery circuitry and a time division multiplexer. On the receive-side, the electrical high-speed channel is recovered from the received signal. The frequency division demultiplexer separates the electrical high-speed channel into its constituent low-speed symbol channels, using frequency division demultiplexing. The demodulator reverses the modulation in order to recover the low-speed data channels from the low-speed symbol channels. The clock and data recovery circuitry recovers the data from each low-speed data channel and also generates a reference clock synchronized to the recovered data. The time division multiplexer combines the recovered data into an outgoing tributary. The tributary contains all of the recovered data, and the tributary is timed by a clock based on the reference clock and hence complies with the jitter tolerance.

In a preferred embodiment, the optical fiber communications system is SONET-based. For example, the incoming tributary is an OC-12, OC-48 or other OC signal. The low-speed data channels are "pseudo-SONET" in that each low-speed data channel has the same data rate as an STS-N signal (e.g., an STS-3 data rate) and has a framing header and a data rate which conforms to the SONET protocol, but the payload does not conform to the SONET protocol. Thus, for example, an incoming OC-48 tributary may be split into sixteen "pseudo STS-3" low-speed data channels. In addition, the splitting may occur in multiple stages, with each stage using pseudo-SONET signals. For example, in one embodiment, the incoming OC-48 tributary is split into pseudo STS-12 signals, each of which is then further split into pseudo STS-3 signals.

Transmitting and receiving data as described above is advantageous since the entire system is transparent for jitter tolerance purposes. In other words, if the incoming tributary meets the jitter tolerance, then the outgoing tributary will also meet the jitter tolerance even though the tributary has been processed and transformed many times during transmission. The various reference clocks are used to remove unwanted jitter which may accumulate during transmission.

Another aspect of the invention includes methods for transmitting and receiving data across an optical fiber communication system while maintaining the jitter tolerance of the data, as described above.

BRIEF DESCRIPTION OF THE DRAWING

The invention has other advantages and features which will be more readily apparent from the following detailed description of the invention and the appended claims, when taken in conjunction with the accompanying drawing, in which:

FIGS. 3A–3C are frequency diagrams illustrating operation of system 100;

FIG. 5A is a block diagram of a preferred embodiment of low-speed output converter 270;

FIG. 5B is a block diagram of a preferred embodiment of low-speed input converter 275;

FIG. 6A is a block diagram of a preferred embodiment of demodulator 620;

FIG. 6B is a block diagram of a preferred embodiment of modulator 640;

FIG. 8A is a block diagram of a preferred embodiment of RF down-converter 624;

DETAILED DESCRIPTION OF THE PREFERRED EMBODIMENTS

Figure 1A:
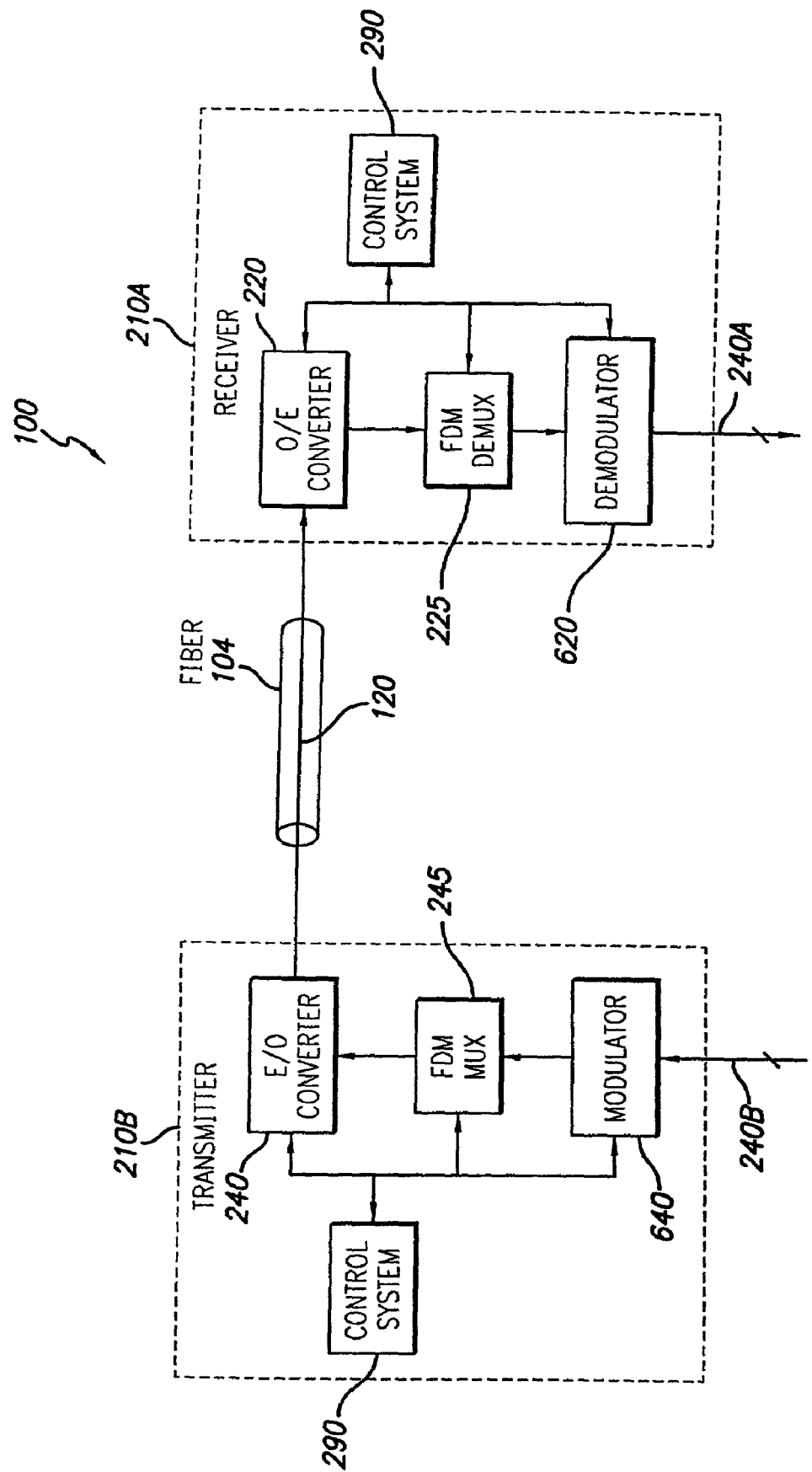
FIG. 1A is a block diagram of a fiber optic communications system 100 in accordance with the present invention.

FIG. 1A is a block diagram of a fiber optic communications system 100 in accordance with the present invention. System 100 includes a transmitter 210B coupled to a receiver 210A by an optical fiber 104. Transmitter 210B and receiver 210A are both based on frequency division multiplexing (FDM). Transmitter 210B includes a modulator 640, FDM multiplexer 245 and E/O converter 240, coupled in series. The modulator 640 applies a modulation to a plurality of incoming signals 240B. The FDM multiplexer 245 combines the modulated signals into a single signal using FDM techniques. E/O converter 240 converts this single signal from electrical to optical form 120. The E/O converter 240 preferably includes an optical source, such as a laser, and an optical modulator, such as a Mach Zender modulator, which modulates the optical carrier produced by the optical source with an incoming electrical signal.

For convenience, the incoming signals 240B shall be referred to as low-speed data channels; the modulated signals produced by modulator 640 as low-speed symbol channels, the single signal formed by FDM multiplexer 245 as an electrical high-speed channel, and the final optical output 120 as an optical high-speed channel. As used in this description, a data channel is a stream of data whereas a symbol channel is a stream of symbols. "Data" typically refers to individual bits so, for example, a bit stream would be an example of a data channel. In contrast, "symbol" typically refers to a representation suitable for transmission over an analog tranmission medium. Each symbol may represent one or more than one bit, depending on the modulation technique used.

Receiver 210A reverses the function performed by transmitter 210B, reconstructing the original data channels 240B at the receiver location. More specifically, receiver 120 includes an O/E converter 220, an FDM demultiplexer 225, and a demodulator 620, coupled in series. The O/E converter 220, preferably a detector such as a high-speed PIN diode, converts the incoming optical high-speed channel 120 from optical to electrical form. The frequency division demultiplexer 225 frequency division demultiplexes the electrical high-speed channel into a plurality of low-speed symbol channels, which are then demodulated by demodulator 620 to recover the original low-speed data channels 240A.

The various components in transmitter 210B and receiver 210A are controlled by their respective control systems 290. The control systems 290 preferably also have an external port to allow external control of the transmitter 210B and receiver 210A. For example, an external network management system may manage a large fiber network, including a number of transmitters 210B and receivers 210A. Alternately, a technician may connect a craft terminal to the external port to allow local control of transmitter 210B or receiver 210A, as may be desirable during troubleshooting.

Figure 1B:
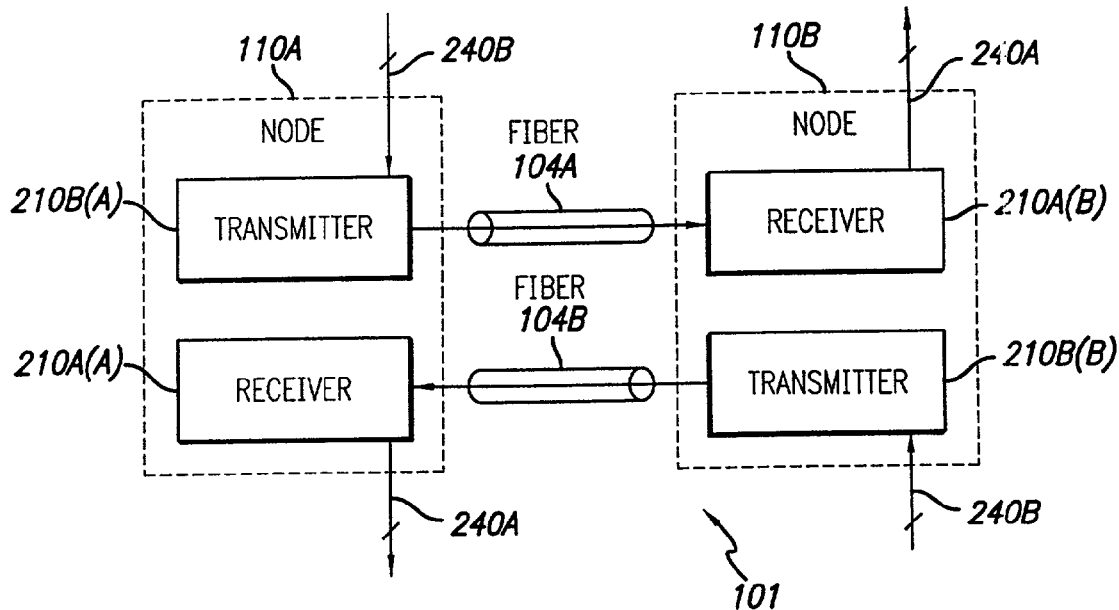
FIG. 1B is a block diagram of another fiber optic communications system 101 in accordance with the present invention.

Various aspects of the invention will be illustrated using the example system 100. However, the invention is not limited to this particular system 100. For example, FIG. 1B is a block diagram of another fiber optic communications system 101 also in accordance with the present invention. System 101 includes two nodes 110A and 110B, each of which includes a transmitter 210B and receiver 210A. The two nodes 110 are coupled to each other by two fibers 104A and 104B, each of which carries traffic from one node 110 to the other 110. Fiber 104A carries traffic from transmitter 210B(A) to receiver 210A(B); whereas fiber 104B carries traffic from transmitter 210B(B) to receiver 210A(A). In a preferred embodiment, the fibers 104 also carry control or other overhead signals between the nodes 110. In an alternate embodiment, the nodes 110 may be connected by a single fiber 104 which carries bidirectional traffic. In other embodiments, the nodes 110 may contain additional functionality, such as add-drop functionality, thus allowing the nodes 110 to from more complex network configurations.

Figure 2:
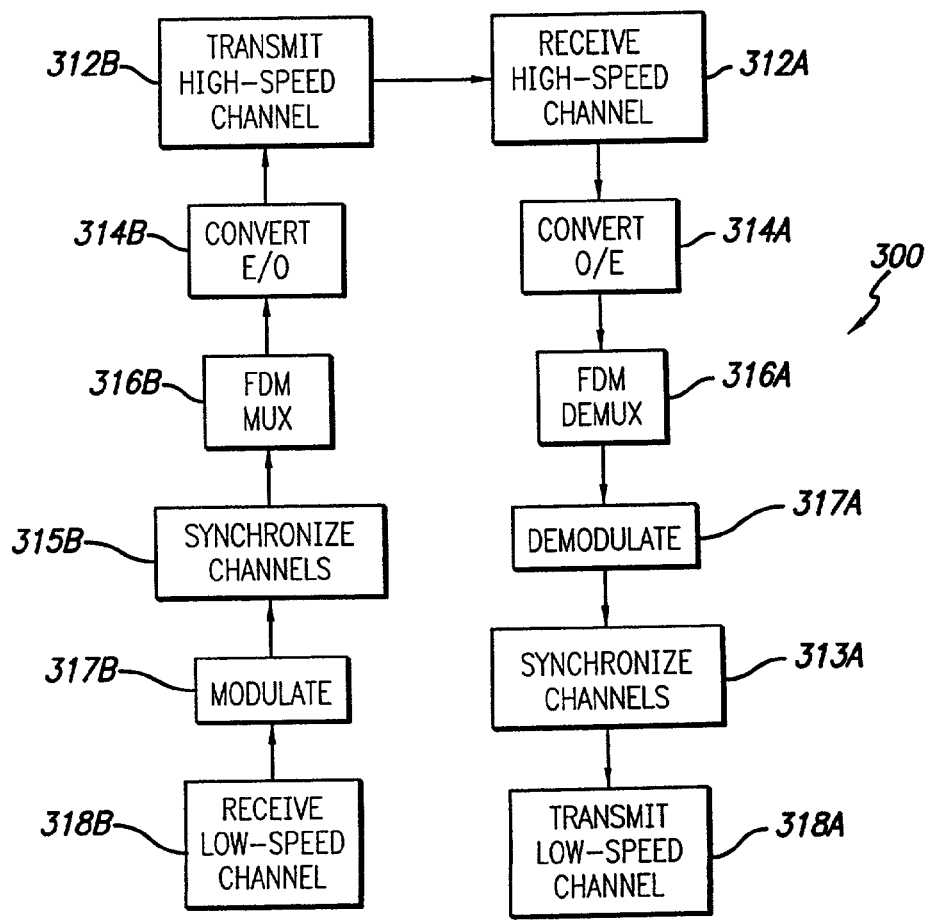
FIG. 2 is a flow diagram illustrating operation of system 100.

FIG. 2 is a flow diagram illustrating operation of system 100. At a high level, transmitter 210B combines low-speed channels 240B into an optical high-speed channel 120 using FDM techniques (steps 318B–312B). The optical high-speed channel 120 is transmitted across fiber 104 (steps 312). Receiver 210A then demultiplexes the received optical high-speed channel 120 into its constituent low-speed channels 240A (steps 312A–318A).

In more detail, low-speed data channels 240B are received 318B by transmitter 210B. Modulator 640 modulates 317B the low-speed data channels 240B to produce corresponding low-speed symbol channels. The low-speed symbol channels are synchronized 315B to the corresponding low-speed data channels, thus preserving the original timing of the low-speed data channels and preventing the excess accumulation of jitter. The FDM multiplexer 245 combines the symbol channels into a high-speed channel using frequency division multiplexing 316B techniques. Typically, each low-speed channel 240B is modulated on a carrier frequency distinct from all other carrier frequencies and these modulated carriers are then combined to form a single electrical high-speed channel, typically an RF signal. E/O converter 240 converts 314B the electrical high-speed channel to optical form, preferably via an optical modulator which modulates an optical carrier with the electrical high-speed channel. The optical high-speed channel 120 is transmitted 312B across fiber 104 to receiver 210A.

FIGS. 3A–3C are frequency diagrams illustrating the mapping of low-speed channels 240B to optical high-speed channel 120 in system 100. These diagrams are based on an example in which high-speed channel 120 carries 10 billion bits per second (Gbps), which is equivalent in data capacity to an OC-192 data stream. Each low-speed channel 240 is an electrical signal which has a data rate of 155 million bits per second (Mbps) and is similar to an STS-3 signal. This allows 64 low-speed channels 240 to be included in each high-speed channel 120. The invention, however, is not to be limited by this example.

FIG. 3A depicts the frequency spectrum 310 of one low-speed data channel 240B after modulation. In other words, spectrum 310 is the spectrum of the corresponding low-speed symbol channel. As mentioned previously, each low-speed data channel 240B has a data rate of 155 Mbps. In this example, the low-speed data channel 240B has been modulated and otherwise processed to produce a spectrally efficient waveform (i.e., a narrow spectrum), as will be described below. The resulting spectrum 310 has a width of approximately 72 MHz with low sidelobes. FIG. 3B is the frequency spectrum 320 of the electrical high-speed channel produced by FDM multiplexer 245. Each of the 64 low-speed channels 240B is allocated a different frequency band and then frequency-shifted to that band. The signals are combined, resulting in the 64-lobed waveform 320. FIG. 3C illustrates the spectra 330 of the optical high-speed channel 120. The RF waveform 320 of FIG. 3B is intensity modulated. The result is a double sideband signal with a central optical carrier 340. Each sideband 350 has the same width as the RF waveform 320, resulting in a total bandwidth of approximately 11 GHz.

Receiver 210A reverses the functionality of transmitter 210B. The optical high-speed channel 120 is received 312A by the high-speed receiver 210A. O/E converter 220 converts 314A the optical high-speed channel 120A to an electrical high-speed channel, typically an RF signal. This electrical high-speed channel includes a number of low-speed symbol channels which were combined by frequency division multiplexing. FDM demultiplexer 225 frequency division demultiplexes 316A the high-speed signal to recover the low-speed symbol channels. Demodulator 620 demodulates 317A the low-speed symbol channels, thus recovering the original low-speed data channels 240A. The data channels 240A are synchronized 313A to the corresponding symbol channels, again maintaining the original timing of the low-speed channel and preventing the excess accumulation of jitter. The recovered low-speed data channels are then transmitted 318A to other destinations. The frequency spectrum of signals as they propagate through receiver 210A generally is the reverse of that shown in FIG. 3.

In a preferred embodiment, a frequency band located between the sidebands and the optical carrier 340 is allocated for control and/or administrative purposes (e.g., for downloading software updates). In system 101 of FIG. 1B, the control systems 290 for each node 110 may communicate with each other by using the control channels on the two fibers 104. For example, control signals generated at receiver 210A(B) may be communicated to transmitter 210B(A) via the control channel on fiber 104B, and vice versa. Since it is often desirable to establish initial communications between nodes 110 using the control channel before establishing the actual data links using sidebands 350, the control channel preferably has a lower data rate and is less susceptible to transmission impairments than the data carrying sidebands 350.

Note that the synchronization steps 315B and 313A preserve the original timing of the low-speed data channels 240B as they are transmitted across system 100. In particular, the timing of a low-speed data channel 240B is transferred to the corresponding low-speed symbol channel generated by transmitter 210B because the symbol channel is synchronized 315B to the data channel 240B. On the receive side, this timing is further transferred to the recovered low-speed data channel 240A because the recovered data channel is synchronized 313A to the symbol channel. In short, the recovered data channel 240A is synchronized 313A to the symbol channel, which in turn is synchronized to the incoming data channel 240B. Thus, the entire system 100 is effectively transparent with respect to timing issues since the timing of outgoing data channel 240A effectively has the same timing as that of incoming data channel 240B.

Furthermore, the synchronization steps 315B and 313A, which maintain the original timing of each low-speed channel, occur on a low-speed channel by low-speed channel basis, either before the low-speed channels 240 have been frequency division multiplexed 316B to form the high-speed channel 120 or after the high-speed channel 120 has been frequency division demultiplexed 316A to recover the constituent low-speed channels 240. This approach simplifies the synchronization steps 315B and 313A because the timing synchronization is performed on low-speed electrical signals rather than high-speed signals 120, which would be more difficult.

The channel by channel approach is feasible because the synchronized low-speed channels are combined using frequency division multiplexing, with each low-speed channel 240 allocated a different frequency band for transmission. For example, referring again to FIG. 3, the low frequency channel 310A may enter transmitter 210B at or near baseband. FDM multiplexer 245 upshifts this channel 310A to a frequency of approximately 900 MHz. E/O converter 240 then intensity modulates this channel, resulting in two sidelobes 350A which are 900 MHz displaced from the optical carrier 340. Low-speed channel 310A propagates across fiber 104 at these particular frequencies and is then downshifted accordingly by receiver 210A. In contrast, the high frequency channel 310N is upshifted by FDM multiplexer 245 to a frequency of approximately 5436 MHz and sidelobes 350N are correspondingly displaced with respect to optical carrier 340. The use of frequency division multiplexing to combine the low-speed channels does not significantly affect the timing of the constituent low-speed channels. Hence, they may be synchronized 315B before being combined, frequency division multiplexed 316B to allow for spectrally-efficient transmission 312 across fiber 104, and then demultiplexed 316A at receiver 210A, all without significantly affecting the original timing. In contrast, time-division multiplexing (TDM) often requires that low-speed channels be time-shifted to the correct timeslot in order to correctly combine them. Hence, synchronizing a low-speed channel before TDM multiplexing it with other low-speed channels is not particularly useful since the low-speed channel will have to be retimed as part of the TDM process, thus defeating the purpose of synchronization.

FIGS. 4–8 are more detailed block diagrams illustrating various portions of a preferred embodiment of system 100. Each of these figures includes a part A and a part B, which correspond to the receiver 210A and transmitter 210B, respectively. These figures will be explained by working along the transmitter 210B from the incoming low-speed channels 240B to the outgoing high-speed channel 120, first describing the component in the transmitter 120B (i.e., part B of each figure) and then describing the corresponding components in the 120A (i.e., part A of each figure). These figures are based on the same example as FIG. 3, namely 64 STS-3 data rate low-speed channels 240 are multiplexed into a single optical high-speed channel 120. However, the invention is not to be limited by this example or to the specific structures disclosed.

Figure 4A:
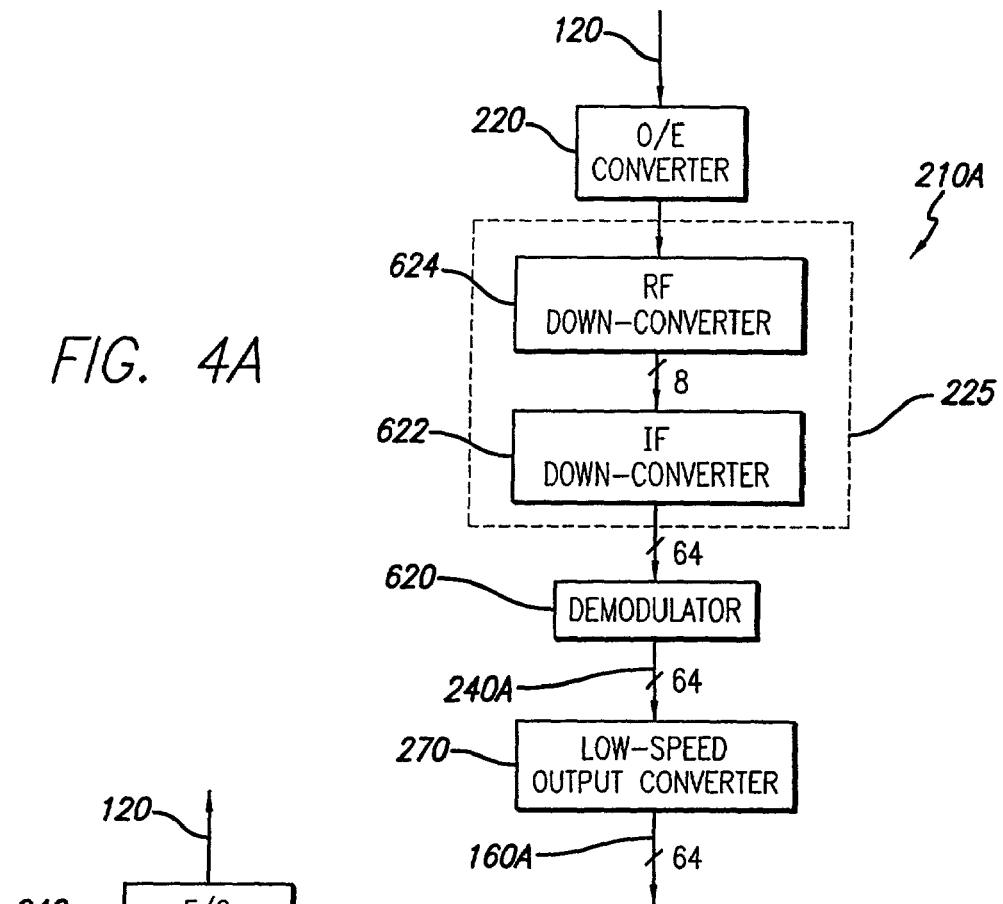
FIG. 4A is a block diagram of a preferred embodiment of FDM demultiplexer 225.
Figure 4B:
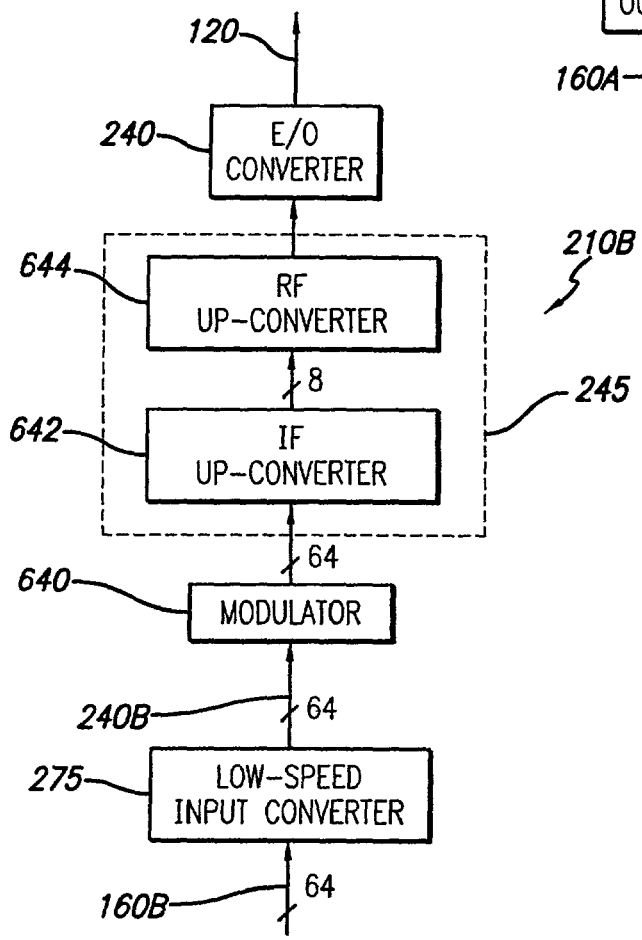
FIG. 4B is a block diagram of a preferred embodiment of FDM multiplexer 245.

FIG. 4B is a block diagram of a preferred embodiment of transmitter 210B. In addition to the components shown in FIG. 1A, this transmitter 210B also includes a low-speed input converter 275 coupled to the modulator 620. FDM multiplexer 245 includes two stages: an IF up-converter 642 and an RF up-converter 644 coupled in series. FIGS. 5B–8B show further details of each of these respective components. Similarly, FIG. 4A is a block diagram of a preferred embodiment of receiver 210A. In addition to the components shown in FIG. 1A, this receiver 210A also includes a low-speed output converter 270 coupled to the FDM demultiplexer 225. FDM demultiplexer 225 includes an RF down-converter 624 and IF down-converter 622 coupled in series, with FIGS. 5A–8A showing the corresponding details.

FIGS. 5A–5B are block diagrams of one example of low-speed converter 270,275, both of which maintain timing of the incoming signals. In the transmit direction, low-speed input converter 275 converts tributaries 160B to low-speed channels 240B, which have the same data rate as STS-3 signals in this embodiment. The structure of converter 275 depends on the format of the incoming tributary 160B. For example, if tributary 160B is an electrical signal then no conversion is required. If it is an optical signal, then converter 275 will perform an optical to electrical conversion.

In the example of FIG. 5B, converter 275 is designed to handle an OC-12 tributary. Converter 275 includes an O/E converter 510, CDR 512, TDM demultiplexer 514, and parallel to serial converter 516 coupled in series. The O/E converter 510 converts the incoming OC-12 tributary 160B from optical to electrical form, producing the corresponding STS-12 signal. CDR 512 performs clock and data recovery of the STS-12 signal and also determines framing for the signal. CDR 512 also converts the incoming bit stream into a byte stream. The output of CDR 512 is byte-wide, as indicated by the "×8." Demultiplexer 514 receives the signal from CDR 512 one byte at a time and byte demultiplexes the recovered STS-12 signal using time division demultiplexing (TDM) techniques. The result is four separate byte-wide signals, as indicated by the "4×8," each of which is equivalent in data rate to an STS-3 signal and with the corresponding framing. Converter 516 also converts each byte-wide signal into a serial signal at eight times the data rate, with the resulting output being four low-speed channels 240B, each at a data rate of 155 Mbps and phase-locked to the clock recovered by CDR 512 from the incoming OC-12 signal.

Low-speed input converter 270 of FIG. 5A implements the reverse functionality of converter 275, converting four 155 Mbps low-speed channels 240A into a single outgoing OC-12 tributary 160A. In particular, converter 270 includes CDR 528, FIFO 526, TDM multiplexer 524, parallel to serial converter 522, and E/O converter 520 coupled in series. CDR 528 performs clock and data recovery of each of the four incoming low-speed channels 240A, determines framing for the channels, and converts the channels from serial to byte-wide parallel. The result is four byte-wide signals entering FIFO 526. FIFO 526 is a buffer which is used to synchronize the four signals in preparation for combining them into a single STS-12 signal. Multiplexer 524 performs the actual combination using TDM, on a byte level, to produce a single byte-wide signal equivalent in data capacity to an STS-12 signal. Parallel to serial converter 522 adds STS-12 framing to complete the STS-12 signal and converts the signal from byte-wide parallel to serial. E/O converter converts the STS-12 signal to electrical form, producing the outgoing OC-12 tributary 160A which is phase-locked to the incoming clock recovered by CDR 528.

Figure 9A:
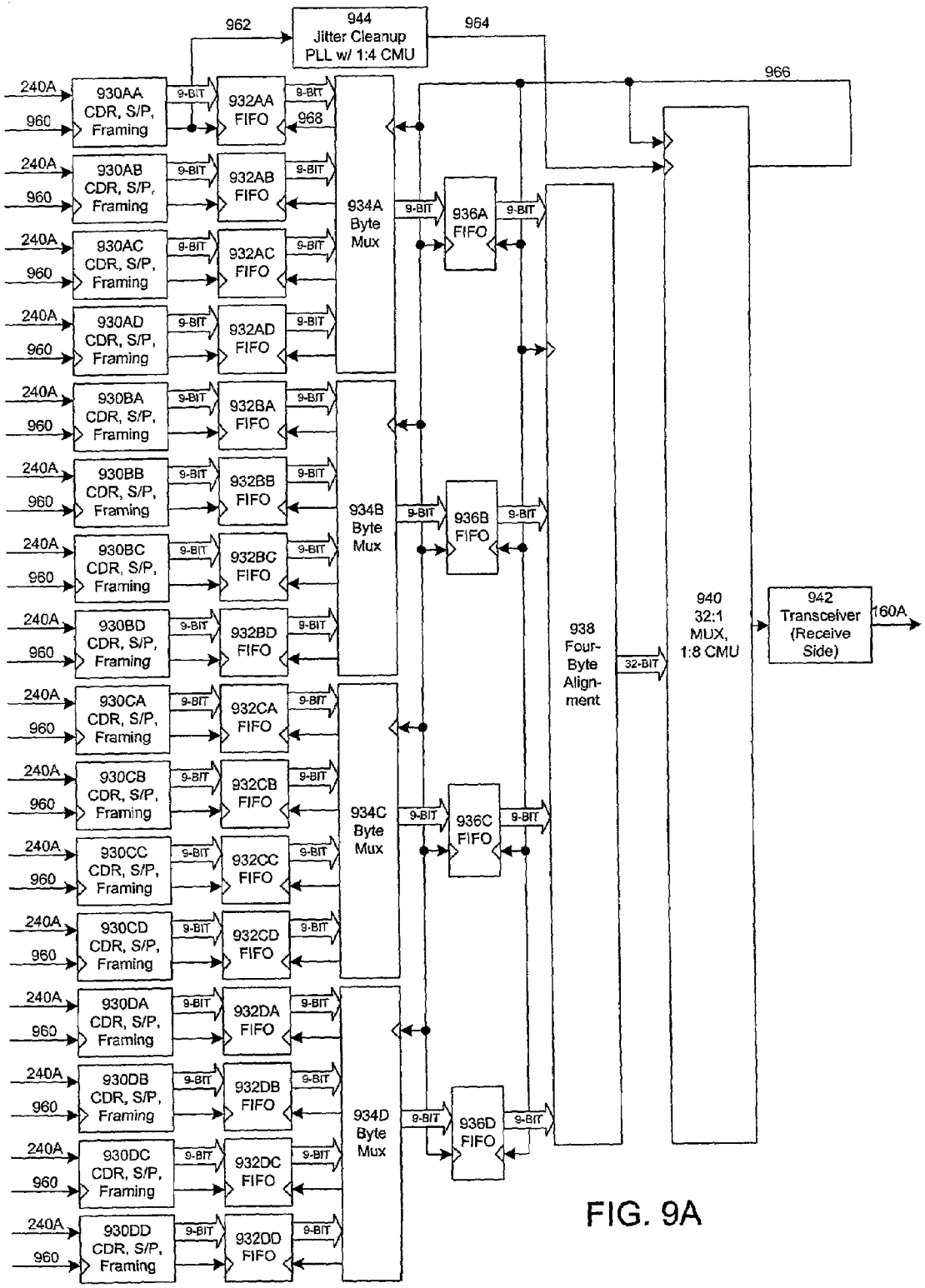
FIG. 9A is a block diagram of another preferred embodiment of low-speed output converter 270.
Figure 9B:
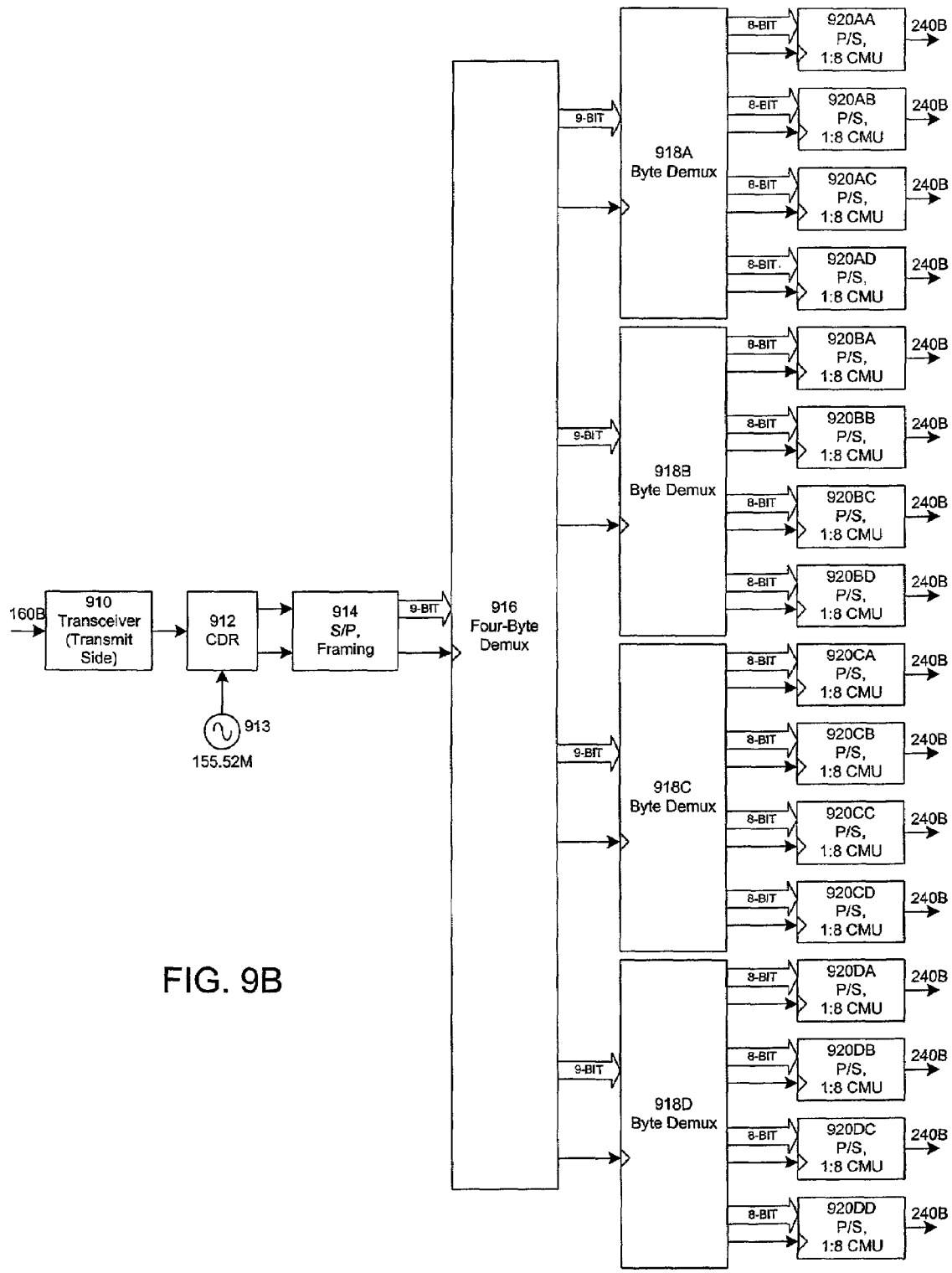
FIG. 9B is a block diagram of another preferred embodiment of low-speed input converter 275.

FIGS. 9A–9B are block diagrams of another example of low-speed converters 270,275 which convert between OC-48 tributaries and STS-3 data rate low-speed channels. For convenience, the STS-3 data rate low-speed channels shall be referred to as pseudo STS-3 signals because they have a valid STS-3 framing header but the remainder of the overhead and payload are not necessarily SONET-compliant. As with the low-speed converters 270,275 of FIG. 5, the low-speed converters in FIG. 9 also maintain the timing and jitter tolerance of the incoming signals. For example, if an incoming OC-48 tributary meets SONET jitter requirements, it will travel through the low-speed input converter 275 and transmitter 210B, across fiber 104, and then through receiver 210A and low-speed output converter 270; and the outgoing OC-48 tributary will also meet SONET jitter requirements.

Referring first to FIG. 9B, low-speed input converter 275 includes an O/E converter 910, STS-48 clock and data recovery (CDR) circuit 912, serial to parallel and framing circuitry 914, TDM four-byte demultiplexer 916, TDM byte demultiplexer 918A–D, and parallel to serial converter 920AA–DD coupled in series. The low-speed input converter 275 also includes a local oscillator 913 coupled to the CDR 912.

The O/E converter 910 converts the incoming 2.488 Gbps OC-48 tributary 160B from optical to electrical form, producing the corresponding 2.488 Gbps STS-48 serial signal. CDR 912 performs clock and data recovery of the STS-48 signal. The 155.52 MHz oscillator 913 is frequency multiplied by 8 to provide a stable 2.488 GHz reference clock for the CDR 912, thus allowing the CDR 912 to retime the serial STS-48 input data and significantly reduce any jitter in the incoming OC-48 signal. The 2.488 Gbps data stream and 2.488 GHz clock recovered from the incoming STS-48 signal are sent to the framing circuitry 914. This circuitry 914 determines framing for the signal and also converts the incoming bit stream into a byte stream. The incoming 2.488 GHz clock is also divided by 8 to produce the corresponding 311 MHz clock. The output of circuitry 914 includes a 311 Mbps byte-wide data stream plus a framing pulse as indicated by the "9-BIT" designation, and the corresponding 311 MHz clock.

Four-byte demultiplexer 916 receives these signals and demultiplexes the STS-48 data stream using time division demultiplexing (TDM) techniques. The demultiplexing occurs four bytes at a time. In other words, the first four bytes of the STS-48 data stream go to output signal A destined for TDM byte demultiplexer 918A, the next four bytes to signal B, the next four to signal C, and the last four to signal D. The result of this first stage 916 of demultiplexing is four sets of signals, each destined for one of the TDM byte demultiplexers 918A–D. Each set of signals includes a byte-wide signal and corresponding framing pulse, as indicated by the "9-BIT" label, and also the corresponding 77.76 MHz clock. The clocks are produced by frequency dividing the incoming 311 MHz clock by four. Each of the four outgoing signals is equivalent in data rate to an STS-12 signal and uses SONET-compliant framing but the rest of the signal is not necessarily SONET-compliant. In other words, the four-byte demultiplexer 916 produces four pseudo STS-12 signals.

Each of the four byte demultiplexers 918A–D performs a function similar to the four-byte demuliplexer 916. Specifically, each byte demultiplexer 918 demultiplexes the incoming pseudo STS-12 data stream into four pseudo STS-3 data streams using time division demultiplexing (TDM) techniques. The demultiplexing occurs on a byte level. The output of each byte demultiplexer 918 includes four pseudo STS-3 data streams (the framing pulse is no longer required) and the corresponding 19.44 MHz clock. The STS-3 clock is generated by frequency dividing the incoming STS-12 clock by four. Each of these clock and data streams is destined for one of the sixteen parallel to serial converters 920AA–DD.

The parallel to serial converters 920 convert each byte-wide pseudo STS-3 signal into a serial pseudo STS-3 signal 240B at eight times the clock rate (i.e., at a clock rate of 155.52 MHz). The clock is generated by frequency multiplying the incoming 19.44 MHz clock by eight. The overall result is that low-speed input converter 275 converts an incoming OC-48 signal 160B into sixteen pseudo STS-3 signals 240B, each of which is clocked out by a clock derived from stable local oscillator 913.

Low-speed output converter 270 implements the reverse functionality of input converter 275, converting sixteen 155 Mbps low-speed channels 240A into a single outgoing OC-48 tributary 160A. In particular, low-speed output converter 270 includes STS-3 CDR circuitry 930AA–DD, FIFOs 932AA–DD, TDM byte multiplexers 934A–D, FIFOs 936A–D, four-byte alignment circuitry 938, 32:1 parallel to serial converter 940, and E/O converter 942 coupled in series.

The CDRs 930 perform clock and data recovery on the incoming low-speed channels 240A, determine framing for the channels, and convert the channels from serial to byte-wide parallel. The output of each CDR 930 is byte-wide data, framing pulse and 19.44 MHz clock 962. The clock 962 is generated by phase aligning the 19.44 MHz reference clock 960 to a frequency divided version of the recovered 155.52 MHz clock and is used to clock the byte-wide data and framing pulse into FIFOs 932.

A separate 19.44 MHz clock 968 is used to clock the byte-wide data out of the FIFOs 932. More specifically, this 19.44 MHz clock 968 is received by the FIFOs 932 from their respective byte multiplexers 934. The generation of this clock 968 is described in more detail below. For now, it is sufficient to note that the output clocking and read enable control of FIFOs 932 are used to align the incoming pseudo STS-3 signals, four at a time, in preparation for combining them into a single pseudo STS-12 signal. In this particular example, alignment is achieved by using a state machine which aligns the frame pulses of the respective pseudo STS-3 signals at the output of the FIFOs 932. Taking byte multiplexer 934A as an example, the outputs of FIFOs 932AA–932AD are clocked such that the data input to byte multiplexer 934A is aligned in a manner which permits byte multiplexer 934A to multiplex the four incoming signals into a single pseudo STS-12 signal at its output. The alignment function removes any skew between the four signals which might arise, for example, due to different path delays experienced by each signal. The byte-wide STS-12 signal is clocked out of byte multiplexer 934A via a 77.76 MHz clock 966.

This same 77.76 MHz clock 966 is also used to clock the data into and out of the corresponding FIFOs 936. On the output side of FIFOs 936, the data enters the four-byte alignment circuitry 938, which aligns and interleaves the data received from the four FIFOs 936. The output of alignment circuitry 938 is a 32-bit STS-48 signal reconstructed from the four byte-wide pseudo STS-12 data streams, each representing four of the original pseudo STS-3 signals. The 32:1 multiplexer 940 performs a 32:1 multiplexing in order to produce the outgoing serial STS-48 signal.

E/O converter 942 converts the STS-48 signal to optical form, producing the outgoing OC-48 tributary 160A. The end result is that the sixteen pseudo STS-3 signals 240B are reassembled into an OC-48 signal in a manner which preserves the timing of the original OC-48 signal (e.g., the outgoing OC-48 tributary 160A meets the same jitter tolerance specifications as the incoming OC-48 tributary 160B).

Clocking of low-speed output converter 275 is as follows. The incoming reference clocks 960 are at 19.44 MHz. They are phase aligned to the recovered 155.52 MHz clock to yield 19.44 MHz clocks 962. This clock is used to clock data into the FIFOs 932 and is fed to a phase-locked loop 944 which generates a clean 77.76 MHz reference clock 964 that provides the timing for the rest of the low-speed output converter 275. The 77.76 MHz clock 964 enters the 32:1 multiplexer 940, where it is frequency multiplied by 32 to synthesize a 2.488 GHz clock that is used to output the STS-48 serial data. The same timing circuitry used to synthesize the 2.488 GHz clock also generates a 77.76 MHz clock 966 that is phase-locked to the 2.488 GHz clock. The 77.76 MHz clock 966 is fanned out to achieve the timing for the circuitry that processes the data that is received by the 32:1 multiplexer 940. One version of this clock 966 is fed back to the 32:1 multiplexer 940, where it is used to clock the data received from the alignment circuitry 938. Other versions of clock 966 are used to clock the four-byte alignment circuitry 938, inputs and outputs of FIFOs 936, and the output of byte multiplexers 934. The clock 966 is also frequency divided by four by the byte multiplexers 934, to yield the 19.44 MHz clocks 968 used to clock the output of FIFOs 932.

Figure 9C:
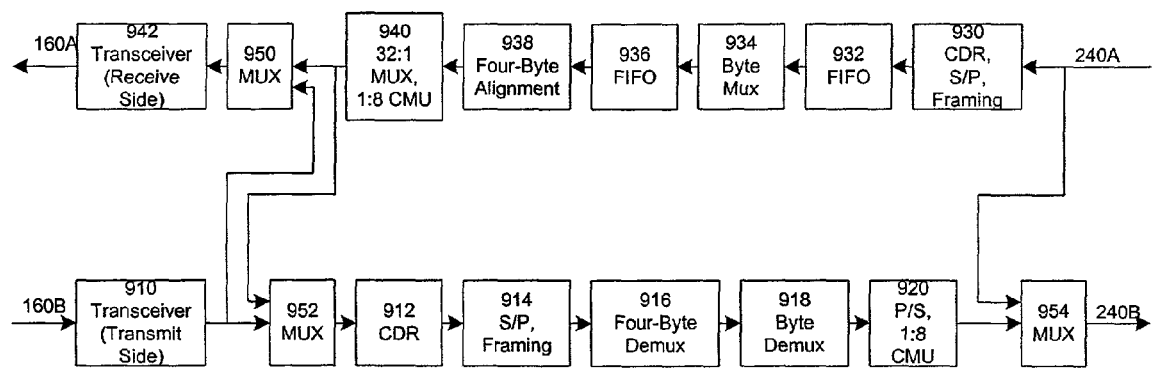
FIG. 9C is a block diagram of a preferred implementation of low-speed output converters 270,275.

FIG. 9C is a block diagram illustrating a preferred physical implementation of the low-speed converters 270,275 shown in FIGS. 9A–9B. In this example, the two low-speed converters 270,275 are coupled to each other. This is desirable, for example, in the case of nodes 110A and 110B of FIG. 1B, in which each node contains both a transmitter 210B and receiver 210A and therefore also contains both a low-speed input converter 275 and a low-speed output converter 270. Note that in the example of FIG. 9C, the two low-speed converters 270,275 are physically located in the same node 110 but likely are not communicating directly with each other. That is, the two low-speed converters 270,275 are implemented in a transmitter-receiver pair 210B(A)–210A(A) rather than a pair 210B(A)–210A(B). In FIG. 9C, many of the components are represented as simplified blocks. For example, the sixteen parallel to serial converters 920AA–DD in FIG. 9B are represented by the single box 920 in FIG. 9C.

The converters 270,275 in FIG. 9C also include multiplexers to allow for different routing of signals. For example, multiplexer 950 allows shunting of the OC-48 signal. The two inputs to the multiplexer 950 are the output of the O/E converter 910 and the output of the parallel to serial converter 940. The output of the multiplexer 950 goes to the input of the E/O converter 942. If the multiplexer 950 selects the output of the parallel to serial converter 940, then the low-speed output converter 270 operates as described above. However, if the multiplexer 950 selects the output of the O/E converter 910, then an OC-48 signal 160B entering the low-speed input converter 275 will be converted to an STS-48 signal by O/E converter 910, shunted back to E/O converter 942 by the multiplexer 950, converted back to optical form by the E/O converter 942 and output as an OC-48 signal 160A without having traversed the rest of the system.

Similarly, the inputs of multiplexer 952 are the output of the O/E converter 910 and the output of the parallel to serial converter 940. The output of multiplexer 952 is the input to CDR circuitry 912. This multiplexer allows incoming pseduo STS-3 signals 240A to travel through most of the low-speed output converter 270 but then be routed back via the low-speed output converter 275 rather than output as tributaries 160A. Multiplexer 954 allows incoming pseudo STS-3 signals 240A to be routed back as signals 240B without travelling through most of the low-speed converters 270,275. These multiplexers 950, 952 and 954 add flexibility in the routing of signals and are useful, for example, in conducting tests of the various parts of a node 110.

In addition, it should be apparent that the various boxes in these examples do not imply that each box is a separate device. For example, in one embodiment of FIG. 9C, the two transceivers 910 and 942 are implemented as a single, standard OC-48 to STS-48 transceiver module. The remainder of the low-speed input converter 275 is implemented as follows. CDR circuitry 912, serial to parallel and framing circuitry 914, and four-byte demultiplexer 916 are each implemented as a separate standard chip. Each of the four byte demultiplexers 918A–D is implemented as a single programmable logic device. Each of the parallel to serial converters 920AA–DD is combined with its counterpart CDR circuitries 930AA–DD and implemented as a standard transceiver chip. As a result, the 19.44 MHz clock received by parallel to serial converter 920 is also used as the reference clock into CDR circuitry 930. The remainder of the low-speed output converter 270 is implemented as follows. Each set of four FIFOs 932AA–DD and the corresponding byte multiplexer 934A–D is implemented as a single FPGA, for a total of four such FPGAs. The four FIFOs 936 plus four-byte alignment circuitry 938 is implemented as an FPGA. Multiplexer 940 is a standard chip.

Converters 270 and 275 have been described in the context of OC-12 or OC-48 tributaries and low-speed channels with the same date rate as STS-3 signals, but the invention is not limited to these protocols. Alternate embodiments can vary the number, bit rate, format, and protocol of some or all of these tributaries 160 or of the low-speed channels 240. One advantage of the FDM approach illustrated in system 100 is that the system architecture is generally independent of these parameters. For example, the tributaries 160 can comprise four 2.5 Gbps data streams, 16 622 Mbps data streams, 64 155 Mbps data streams, 192 51.84 Mbps data streams, or any other bit rate or combinations of bit rates. Similar flexibility exists for the low-speed channels.

For example, the low-speed converters 270,275 shown in FIG. 9 build on the general principles illustrated in FIG. 5 to extend the OC-12 to STS-3 low-speed converters of FIG. 5 to the OC-48 to STS-3 low-speed converters of FIG. 9. These principles can be further extended to construct OC-192 to STS-3 low-speed converters or low-speed converters for other multiples of the base rate of the low-speed channels 240. In addition, the same principles can be used with low-speed channels 240 other than pseudo STS-3 channels. For example, in a preferred embodiment, the low-speed channels 240 are pseudo STS-48 channels at a data rate of 2.488 Gbps and the low-speed converters 270,275 convert between the pseudo STS-48 channels and OC-192, OC-768 or other types of incoming OC signals.

In another embodiment, the tributaries 160 are at data rates which are not multiples of the STS-3 data rate. In one variant, low-speed input converter 275 demultiplexes the incoming tributary 160B into some number of parallel data streams and then stuffs null data into each resulting stream such that each stream has an STS-3 data rate. For example, if tributary 160B has a data rate of 300 Mbps, converter 275 may demultiplex the tributary into four 75 Mbps streams. Each stream is then stuffed with null data to give four 155 Mbps low-speed channels. In another variant, the speed of the rest of system 100 (specifically the modulator 640 and demodulator 620 of FIG. 4) may be adjusted to match that of the tributary 160. Low-speed output converter 270 typically will reverse the functionality of low-speed input converter 275.

As a final example, the embodiments shown in FIGS. 5 and 9 are merely examples of the OC-12 to pseudo STS-3 and of the OC-48 to pseudo STS-3 functionalities. Other embodiments implementing these conversions will be apparent. For example, both embodiments employ a serial to parallel conversion, with the majority of operations performed on byte-wide data streams even though the input and output tributaries are serial data streams. In an alternate embodiment, the data streams may be processed entirely in a serial fashion. Also, in FIG. 9, the time division multiplexing and demultiplexing occurred in two stages (e.g., four-byte demultiplexing followed by byte demultiplexing). In an alternate embodiment, it may be implemented in a single stage or more than two stages.

Referring to FIG. 6B, modulator 640 modulates the 64 incoming low-speed channels 240B to produced 64 QAM-modulated channels which are input to the IF up-converter 642. For convenience, the QAM-modulated channels shall be referred to as IF channels because they are inputs to the IF up-converter 642. They shall also be referred to as symbol channels because the modulation step converts the incoming stream of data into a corresponding stream of symbols. In this embodiment, each low-speed data channel 240 is modulated separately to produce a single low-speed symbol channel and FIG. 6B depicts the portion of modulator 640 which modulates one low-speed channel. Modulator 640 in its entirety would include 64 of the portions shown in FIG. 6B. For convenience, the single channel shown in FIG. 6B shall also be referred to as a modulator 640. Modulator 640 includes a clock and data recovery module 709 (CDR 709), FIFO 701, modulator 703, and a D/A converter 710 coupled in series. The modulator 703 further includes a Reed-Solomon encoder 702, an interleaver 704, a trellis encoder 706, a digital filter 708 coupled in series. Modulator 640 also includes a synchronizer 712 coupled between the CDR 709 and the filter 708.

Modulator 640 operates as follows. CDR 709 receives the incoming low-speed data channel 240B and recovers both a clock and data from the data channel. The clock, which shall be referred to as a data clock, is transmitted to synchronizer 712. In this embodiment, the CDR 709 includes a phase-locked loop so that the recovered data clock is phase-locked to the incoming low-speed data channel. The recovered data is transmitted to FIFO 701, where it is buffered.

The modulator 703 receives the data from FIFO 701 and generally applies a modulation, converting the data channel to a symbol channel. More specifically in this embodiment, Reed-Solomon encoder 702 encodes the low-speed channel 240B according to a Reed-Solomon code. Programmable Reed-Solomon codes are preferred for maintaining very low BER (typ. lower than $10^{-12}$) with low overhead (typ. less than 10%). This is particularly relevant for optical fiber systems because they generally require low bit error rates (BER) and any slight increase of the interference or noise level will cause the BER to exceed the acceptable threshold. For example, a Reed-Solomon code of (204,188) can be applied for an error correction capability of 8 error bytes per every 204 encoded bytes.

The interleaver 704 interleaves the digital data string output by the Reed-Solomon encoder 702. The interleaving results in more robust error recovery due to the nature of trellis encoder 706. Specifically, forward error correction (FEC) codes are able to correct only a limited number of mistakes in a given block of data, but convolutional encoders such as trellis encoder 706 and the corresponding decoders tend to cause errors to cluster together. Hence, without interleaving, a block of data which contained a large cluster of errors would be difficult to recover. However, with interleaving, the cluster of errors is distributed over several blocks of data, each of which may be recovered by use of the FEC code. In one embodiment, convolution interleaving of depth 0 is preferred in order to minimize latency.

The trellis encoder 706 applies a QAM modulation, preferably 16 state QAM modulation, to the digital data stream output by the interleaver 704. The result typically is a complex baseband signal, representing the in-phase and quadrature (I and Q) components of a QAM-modulated signal. Trellis encoder 706 implements the QAM modulation digitally and the resulting QAM modulated signal is digitally filtered by filter 708 in order to reduce unwanted sidelobes and then converted to the analog domain by D/A converter 710.

Synchronizer 712 receives the data clock generated by CDR 709 and generates a symbol clock synchronized to the data clock. The symbol clock is used to time the output of modulator 703. In this way, the low-speed symbol channel generated by modulator 703 will be synchronized to the incoming low-speed data channel 240B, thus preserving the original timing information and preventing the excess accumulation of jitter. More specifically, in this embodiment, the incoming data channel 240B has a bit rate of 155 Mbps. Since 16 state QAM modulation and error correction is used, every three data bits are converted into one symbol so the corresponding symbol channel has a symbol rate of 56.5 million symbols per second. Similarly, the recovered data clock has a clock rate of 155 MHz while the corresponding symbol clock has a rate of 56.5 MHz. The synchronizer 712 includes a rate-converter which converts the rate of the data clock to that of the symbol clock, thus generating the symbol clock. The synchronizer 712 also includes a phase-locked loop which ensures that the symbol clock is synchronized to the data clock. The output of the synchronizer 712 is coupled to a timing control input for modulator 703. Hence, the symbol clock is used to time the output of symbols from modulator 703, thus ensuring that the resulting low-speed symbol channel is synchronized to the incoming low-speed data channel 240B.

The resulting low-speed symbol channel is a pair of differential signals, representing the I and Q components of the QAM-modulated signal, which are synchronized to the original data channel. In alternate embodiments, the QAM modulation may be implemented using analog techniques.

Referring to FIG. 6A, demodulator 620 reverses the functionality of modulator 640, recovering a low-speed channel 240A from an incoming low-speed symbol channel (i.e., analog I and Q components in this embodiment) received from the IF down-converter 622. Demodulator 620 includes an A/D converter 720, a symbol and clock recovery module 723, demodulator 725, and FIFO 732 coupled in series. The demodualtor 725 further includes an equalizer 724, trellis decoder 726, deinterleaver 728, and Reed-Solomon decoder 730 in series. The symbol and clock recovery module 723 includes a digital Nyquist filter 722 and a synchronizer 734 which forms a loop with Nyquist filter 722. Demodulator 620 further includes another synchronizer 736 which is coupled between clock recovery module 723 and FIFO 732.

Demodulator 620 operates as FIG. 6A would suggest. The A/D converter 720 converts the incoming symbol channel to digital form. The recovery module 723 recovers symbols and timing from the symbol channel. Nyquist filter 722, synchronized by synchronizer 734, reduces unwanted artifacts from the A/D conversion, with the recovered symbols transmitted to demodulator 725. The recovered clock, which shall be referred to as a symbol clock, is phase-locked to the received low-speed symbol channel by a phase-locked loop in module 723 and is transmitted to synchronizer 736.

Equalizer 724 applies equalization to the filtered symbols, for example to compensate for distortions introduced in the IF signal processing. Trellis decoder 726 converts the I and Q complex signals to a digital stream and deinterleaver 728 reverses the interleaving process. Reed-Solomon decoder 730 reverses the Reed-Solomon encoding, correcting errors which have occurred. The recovered data is buffered into FIFO 732.

Synchronizer 736 times the release of data from FIFO 732, ensuring that the resulting low-speed data channel is synchronized to the incoming low-speed symbol channel. In this embodiment, synchronizer 736 includes a rate-converter followed by a frequency multiplier. The recovered symbol clock has a rate of 56.5 MHz. The rate-converter changes this rate to 19.44 MHz. The frequency multiplier performs a times eight function to generate a data clock of frequency 155.5 MHz. Phase-locked loops in both the rate-converter and the frequency multiplier ensure that the data clock is phase-locked to the symbol clock, which is also phase-locked to the received symbol channel.

Considering FIGS. 5B, 6B, 6A and 5A together, note that end-to-end timing is preserved through the use of synchronizers, specifically phase-locked loops in this embodiment although other types of synchronizers may be used. Working backwards from the receive-side to the transmit-side, in FIG. 5A, the CDR 528 ensures that the outgoing tributary 160A is synchronized to the incoming low-speed data channels 240A. In FIG. 6A, the timed FIFO 732 ensures that the recovered low-speed data channel 240A is synchronized to the receive-side data clock generated by synchronizer 736. Synchronizer 736 ensures that this data clock is synchronized to the receive-side symbol clock. Clock recovery module 723 ensures that the symbol clock is synchronized to the received low-speed symbol channel. On the transmit side, in FIG. 6B, modulator 703 ensures that the outgoing low-speed symbol channel is synchronized to the symbol clock generated by synchronizer 712. Synchronizer 712 ensures that the symbol clock is synchronized to the data clock. Clock recovery module 709 ensures that the data clock is synchronized to the received low-speed data channel 240B. In FIG. 5B, CDR 512 ensures that the low-speed data channels 240B are synchronized to the incoming tributary 160B. Thus, the recovered low-speed data channels 240A will maintain the original timing of low-speed data channels 240B, and the recovered tributaries 160A will also maintain the original timing of incoming tributaries 160B.

Referring again to transmitter 210B, IF up-converter 642 receives the 64 low-speed symbol channels from modulator 640. Together, IF up-converter 642 and RF up-converter 644 combine these 64 symbol channels into a single RF signal using FDM techniques. In essence, each of the low-speed symbol channels (or equivalently, each of the 64 low-speed data channels 240B) is allocated a different frequency band within the RF signal. The allocation of frequency bands shall be referred to as the frequency mapping, and, in this embodiment, the symbol channels may also be referred to as IF channels since they are inputs to IF up-converter 642 or as FDM channels since they are the channels which are FDM multiplexed together. The multiplexing is accomplished in two stages. IF up-converter 642 first combines the 64 IF channels into 8 RF channels, so termed because they are inputs to the RF up-converter 644. In general, the terms "IF" and "RF" are used throughout as labels rather than, for example, indicating some specific frequency range. RF up-converter 644 them combines the 8 RF channels into the single RF signal, also referred to as the electrical high-speed channel.

Figure 7A:
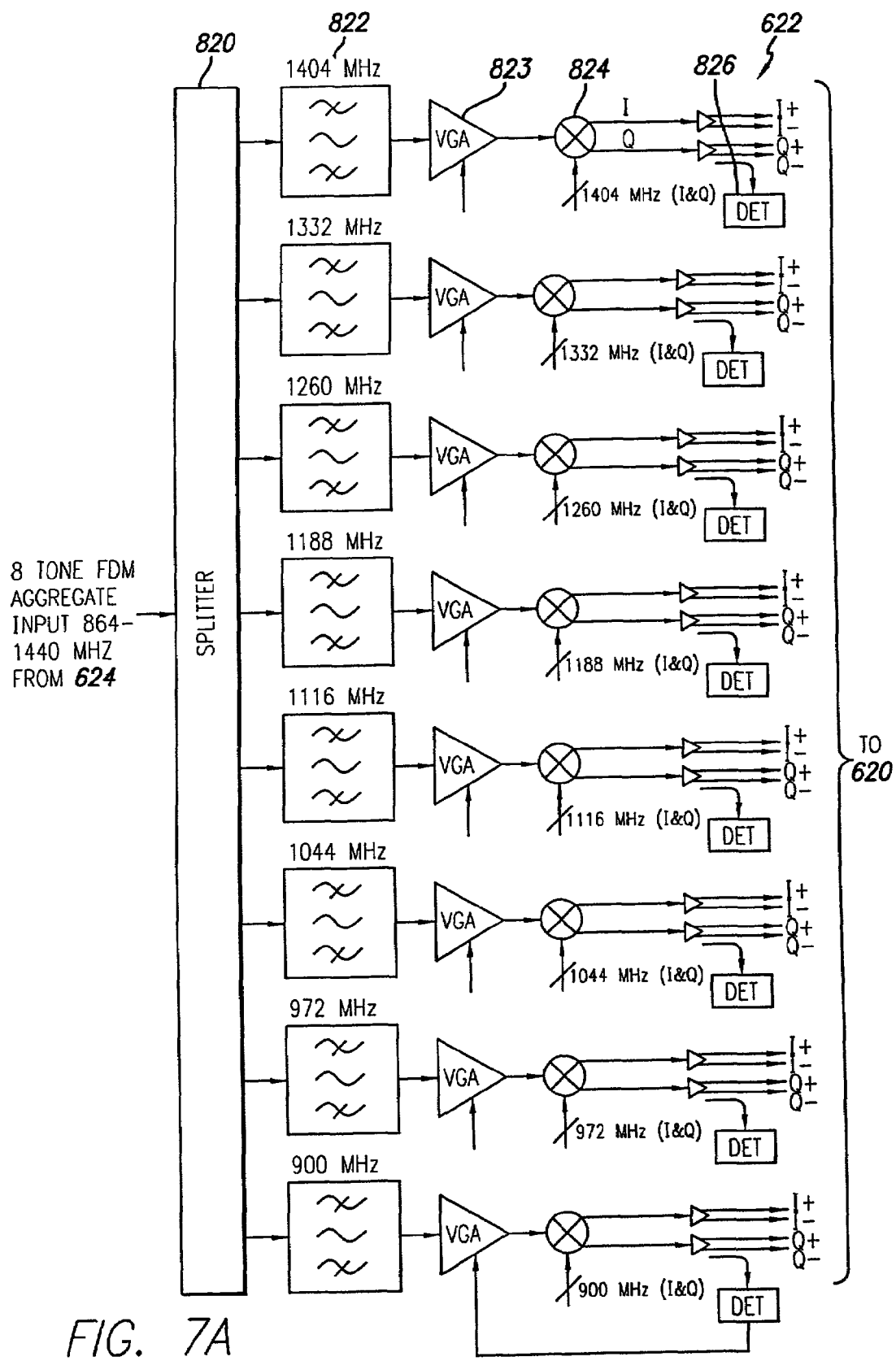
FIG. 7A is a block diagram of a preferred embodiment of IF down-converter 622.
Figure 7B:
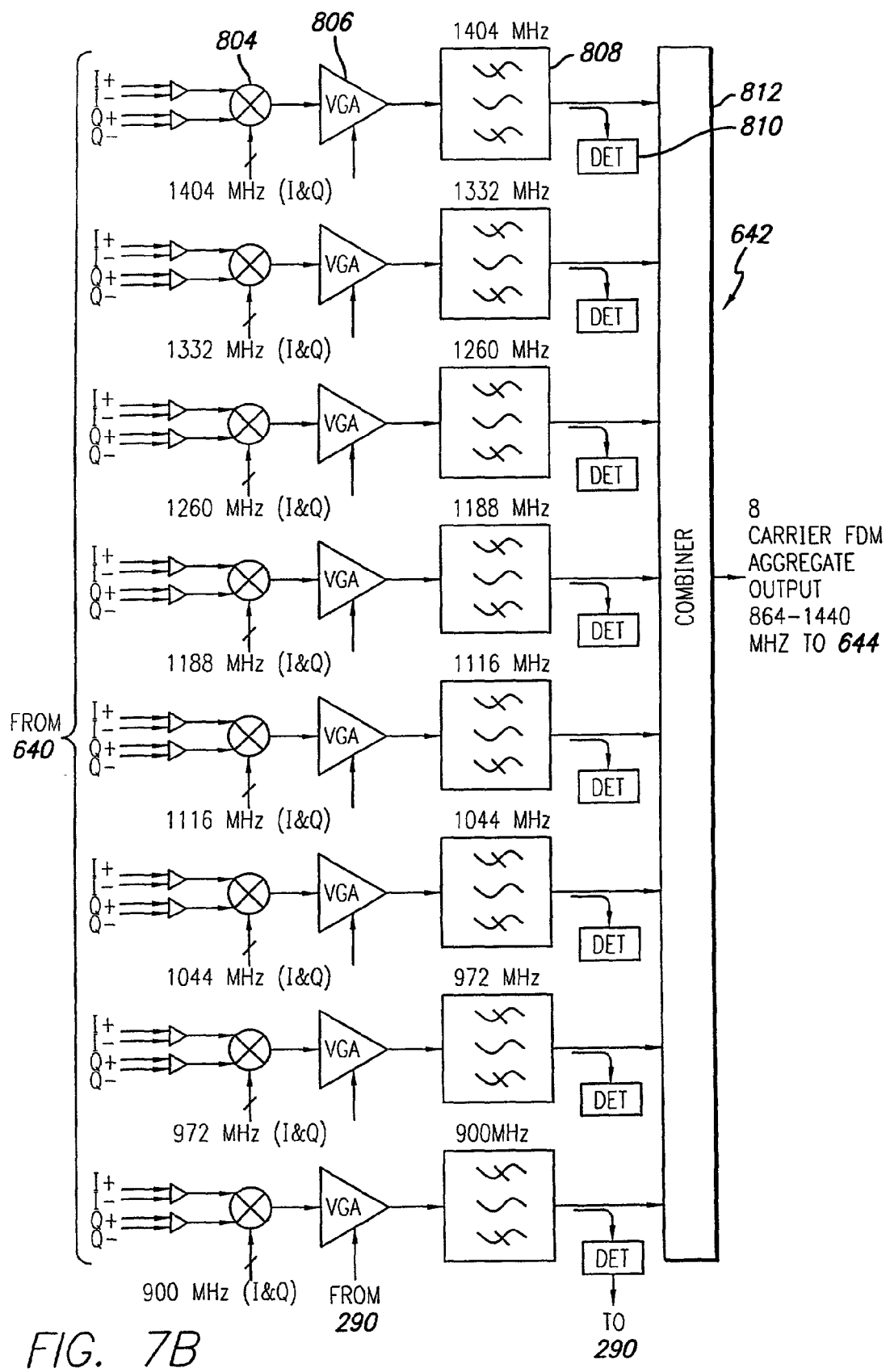
FIG. 7B is a block diagram of a preferred embodiment of IF up-converter 642.

Referring to FIG. 7B, IF up-converter 642 includes eight stages (identical in this embodiment, but not necessarily so), each of which combines 8 IF channels into a single RF channel. FIG. 7B depicts one of these stages, which for convenience shall be referred to as an IF up-converter 642. IF up-converter 642 includes eight frequency shifters and a combiner 812. Each frequency shifter includes a modulator 804, a variable gain block 806, a filter 808, and a power monitor 810 coupled in series to an input of the combiner 812.

IF up-converter 642 operates as follows. Modulator 804 receives the IF channel and also receives a carrier at a specific IF frequency (e.g., 1404 MHz for the top frequency shifter in FIG. 7B). Modulator 804 modulates the carrier by the IF channel. The modulated carrier is adjusted in amplitude by variable gain block 806, which is controlled by the corresponding control system 290, and bandpass filtered by filter 808. Power monitor 810 monitors the power of the gain-adjusted and filtered signal, and transmits the power measurements to control system 290.

In a preferred embodiment, each IF channel has a target power level based on the estimated gain due to transmission through system 100. Control system 290 adjusts the gain applied by variable gain block 806 so that the actual power level, as measured by power monitor 810, matches the target power level. The target power level may be determined in any number of ways. For example, the actual power level may be required to fall within a certain power range or be required to always stay above a minimum acceptable power. Alternately, it may be selected to maintain a minimum channel error rate or to maintain a channel error rate within a certain range. In this embodiment, variable gain block 806 adjusts the power of each low-speed channel 240.

The inputs to combiner 812 are QAM-modulated IF signal at a specific frequency. However, each frequency shifter uses a different frequency (e.g., ranging in equal increments from 900 MHz to 1404 MHz in this example) so combiner 812 simply combines the 8 incoming QAM-modulated signal to produce a single signal (i.e., the RF channel) containing the information of all 8 incoming IF channels. In this example, the resulting RF channel covers the frequency range of 864–1440 MHz.

Figure 8B:
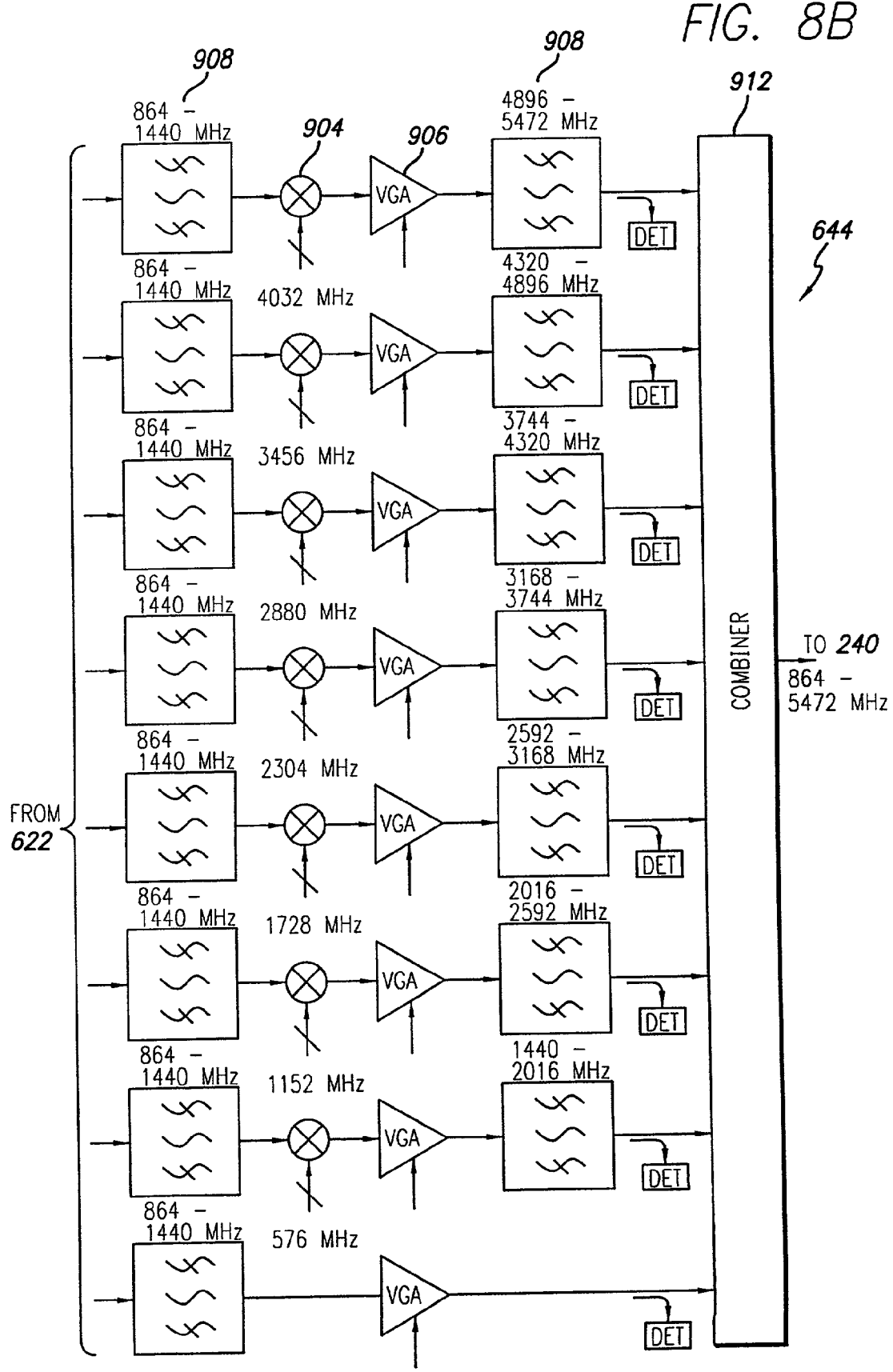
FIG. 8B is a block diagram of a preferred embodiment of RF up-converter 644.

Referring to FIG. 8B, RF up-converter 644 is structured similar to IF up-converter 642 and performs a similar function combining the 8 RF channels received from the IF up-converter 642 just as each IF up-converter combines the 8 IF channels received by it. In more detail, RF up-converter 644 includes eight frequency shifters and a combiner 912. Each frequency shifter includes a mixer 904, various gain blocks 906, and various filter 908 coupled in series to an input of the combiner 912.

RF up-converter 644 operate as follows. Mixer 904 mixes one of the RF channels with a carrier at a specific RF frequency (e.g., 4032 MHz for the top frequency shifter in FIG. 8B), thus frequency upshifting the RF channel to RF frequencies. Gain blocks 906 and filters 908 are used to implement standard amplitude adjustment and frequency filtering. For example, in FIG. 8B, one filter 908 bandpass filters the incoming RF channel and another bandpass filters the produced RF signal, both filters for suppressing artifacts outside the frequency range of interest. Each frequency shifter uses a different frequency (e.g., ranging in equal increments from 0 to 4032 MHz in this example) so combiner 912 simply combines the 8 incoming RF signals to produce the single electrical high-speed channel containing the information of all 8 incoming RF channels or, equivalently, all 64 IF channels received by IF up-converter 642. In this example, the electrical high-speed channel covers the frequency range of 864–5472 MHz.

RF down-converter 624 and IF down-converter 622 implement the reverse functionalities, splitting the RF signal into its 8 constituent RF channels and then splitting each RF channel into its 8 constituent IF channels, respectively, thus producing 64 IF channels (i.e., FDM channels) to be received by demodulator 620.

Referring to FIG. 8A, RF down-converter 624 includes a splitter 920 coupled to eight frequency shifters. Each frequency shifter includes a mixer 924, various gain blocks 926, and various filters 928 coupled in series. Splitter 920 splits the incoming electrical high-speed channel into eight different RF signals and each frequency shifter recovers a different constituent RF channel from the RF signal it receives. Mixer 924 mixes the received RF signal with a carrier at a specific RF frequency (e.g., 4032 MHz for the top frequency shifter in FIG. 8A), thus frequency downshifting the RF signal to its original IF range (e.g., 864–1440 MHz). Filter 928 then filters out this specific IF frequency range. Each frequency shifter uses a different RF frequency with mixer 924 and thus recovers a different RF channel. The output of RF down-converter 624 is the 8 constituent RF channels.

IF down-converter 622 of FIG. 7A operates similarly. It includes a splitter 820 and 8 frequency shifters, each including a bandpass filter 822, variable gain block 823, demodulator 824, and power monitor 826. Splitter 820 splits the incoming RF channel into eight signals, from which each frequency shifter will recover a different constituent IF channel. Filter 822 isolates the frequency band within the RF channel which contains the IF channels of interest. Demodulator 824 recovers the IF channel by mixing with the corresponding IF carrier. The resulting 64 IF channels are input to demodulator 620.

Variable gain block 823 and power monitor 826 control the power level of the resulting IF channel. In a preferred embodiment, each IF channel is output from IF down-converter 622 at a target power in order to enhance performance of the rest of the receiver 210A. Power monitor 826 measures the actual power of the IF channel, which is used to adjust the gain applied by variable gain block 823 in order to match the actual and target power levels.

Many other implementations which achieve the same functionality as the devices in FIGS. 4–8 will be apparent. For example, referring to FIG. 8B, note that the bottom channel occupies the frequency spectrum from 864–1440 MHz and, therefore, no mixer 904 is required. As another example, note that the next to bottom channel is frequency up shifted from the 864–1440 MHz band to the 1440–2016 MHz. In a preferred approach, this is not accomplished in a single step by mixing with a 576 MHz signal. Rather, the incoming 864–1440 MHz signal is frequency up shifted to a much higher frequency range and then frequency down shifted back to the 1440–2016 MHz range. This avoids unwanted interference from the 1440 MHz end of the original 864–1440 MHz signal. For example, referring to FIG. 7B, in a preferred embodiment, the filters 808 are not required due to the good spectral characteristics of the signals at that point. A similar situation may apply to the other filters shown throughout, or the filtering may be achieved by different filters and/or filters placed in different locations. Similarly, amplification may be achieved by devices other than the various gain blocks shown. In a preferred embodiment, both RF down-converter 624 and RF up-converter 644 do not contain variable gain elements. As one final example, in FIGS. 4–8, some functionality is implemented in the digital domain while other functionality is implemented in the analog domain. This apportionment between digital and analog may be different for other implementations. Other variations will be apparent.

The FDM aspect of preferred embodiment 400 has been described in the context of combining 64 low-speed channels 240 into a single optical high-speed channel 120. The invention is in no way limited by this example. Different total numbers of channels, different data rates for each channel, different aggregate data rate, and formats and protocols other than the STS/OC protocol are all suitable for the current invention. In fact, one advantage of the FDM approach is that it is easier to accommodate low-speed channels which use different data rates and/or different protocols. In other words, some of the channels 240B may use data rate A and protocol X; while others may use data rate B and protocol Y, while yet others may use data rate C and protocol Z. In the FDM approach, each of these may be allocated to a different carrier frequency and they can be straightforwardly combined so long as the underlying channels are not so wide as to cause the different carriers to overlap. In contrast, in the TDM approach, each channel is allocated certain time slots and, essentially, will have to be converted to a TDM signal before being combined with the other channels.

Another advantage is lower cost. The FDM operations may be accomplished with low-cost components commonly found in RF communication systems. Additional cost savings are realized since the digital electronics such as modulator 640 and demodulator 620 operate at a relatively low data rate compared to the aggregate data rate. The digital electronics need only operate as fast as the data rate of the individual low-speed channels 240. This is in contrast to TDM systems, which require a digital clock rate that equals the aggregate transmission rate. For OC-192, which is the data rate equivalent to the high-speed channels 120 in system 100, this usually requires the use of relatively expensive gallium arsenide integrated circuits instead of silicon.

Moving further along transmitter 210B, E/O converter 240 preferably includes an optical source and an external optical modulator. Examples of optical sources include solid state lasers and semiconductor lasers. Example external optical modulators include Mach Zender modulators and electro-absorptive modulators. The optical source produces an optical carrier, which is modulated by the electrical high-speed channel as the carrier passes through the modulator. The electrical high-speed channel may be predistorted in order to increase the linearity of the overall system. Alternatively, E/O converter 240 may be an internally modulated laser. In this case, the electrical high-speed channel drives the laser, the output of which will be a modulated optical beam (i.e., the optical high-speed channel 120B).

The wavelength of the optical high-speed channel may be controlled using a number of different techniques. For example, a small portion of the optical carrier may be extracted by a fiber optic splitter, which diverts the signal to a wavelength locker. The wavelength locker generates an error signal when the wavelength of the optical carrier deviates from the desired wavelength. The error signal is used as feedback to adjust the optical source (e.g., adjusting the drive current or the temperature of a laser) in order to lock the optical carrier at the desired wavelength. Other approaches will be apparent.

The counterpart on the receiver 210A is O/E converter 220, which typically includes a detector such as an avalanche photo-diode or PIN-diode. In an alternate approach, O/E converter 220 includes a heterodyne detector. For example, the heterodyne detector may include a local oscillator laser operating at or near the wavelength of the incoming optical high-speed channel 120A. The incoming optical high-speed channel and the output of the local oscillator laser are combined and the resulting signal is detected by a photodetector. The information in the incoming optical high-speed channel can be recovered from the output of the photodetector. One advantage of heterodyne detection is that the thermal noise of the detector can be overcome and shot noise limited performance can be obtained without the use of fiber amplifiers.

The modularity of the FDM approach also makes the overall system more flexible and scaleable. For example, frequency bands may be allocated to compensate for fiber characteristics. For a 70 km fiber, there is typically a null around 7 GHz. With the FDM approach, this null may be avoided simply by not allocating any of the frequency bands around this null to any low-speed channel 240. As a variant, each of the frequency bands may be amplified or attenuated independently of the others, for example in order to compensate for the transmission characteristics of that particular frequency band.

Various design tradeoffs are inherent in the design of a specific embodiment of an FDM-based system 100 for use in a particular application. For example, the type of Reed Solomon encoding may be varied or other types of forward error correction codes (or none at all) may be used, depending on the system margin requirements. As another example, in one variation of QAM, the signal lattice is evenly spaced in complex signal space but the total number of states in the QAM constellation is a design parameter which may be varied. The optimal choices of number of states and other design parameters for modulator/demodulator 640/620 will depend on the particular application. Furthermore, the modulation may differ on some or all of the low speed channels. For example, some of the channels may use PSK modulation, others may use 16-QAM, others may use 4-QAM, while still others may use an arbitrary complex constellation. The choice of a specific FDM implementation also involves a number of design tradeoffs, such as the choices of intermediate frequencies, whether to implement components in the digital or in the analog domain, and whether to use multiple stages to achieve the multiplexing.

As a numerical example, in one embodiment, a (187,204) Reed-Solomon encoding may be used with a rate 3/4 16-QAM trellis code. The (187,204) Reed-Solomon encoding transforms 187 bytes of data into 204 bytes of encoded data and the rate 3/4 16-QAM trellis code transforms 3 bits of information into a single 16-QAM symbol. In this example, a single low-speed channel 240B, which has a base data rate of 155 Mbps would require a symbol rate of 155 Mbps×(204/187)×(1/3)=56.6 Megasymbols per second. Including an adequate guard band, a typical frequency band would be about 72 MHz to support this symbol rate. Suppose, however, that it is desired to decrease the bandwidth of each frequency band. This could be accomplished by changing the encoding and modulation. For example, a (188,205) Reed-Solomon code with a rate 5/6 64-QAM trellis code would require a symbol rate of 155 Mbps×(205/188)×(1/5)=33.9 Megasymbols per second or 43 MHz frequency bands, assuming proportional guard bands. Alternately, if 72 MHz frequency bands were retained, then the data rate could be increased.

As another example, an optical modulator 240 with better linearity will reduce unwanted harmonics and interference, thus increasing the transmission range of system 100. However, optical modulators with better linearity are also more difficult to design and to produce. Hence, the optimal linearity will depend on the particular application. An example of a system-level tradeoff is the allocation of signal power and gain between the various components. Accordingly, many aspects of the invention have been described in the context of certain preferred embodiments but it should be understood that the invention is not to be limited by these specific examples.

It should be noted that the embodiments described above are exemplary only and many other alternatives will be apparent. For example, in the embodiments discussed above, the low-speed channels 240 were combined into an electrical high-speed channel using solely frequency division multiplexing. For example, each of the 64 low-speed channels 240B was effectively placed on a carrier of a different frequency and these 64 carriers were then effectively combined into a single electrical high-speed channel solely on the basis of different carrier frequencies. This is not meant to imply that the invention is limited solely to frequency division multiplexing to the exclusion of all other approaches for combining signals. In fact, in alternate embodiments, other approaches may be used in conjunction with frequency division multiplexing. For example, in one approach, 64 low-speed channels 240B may be combined into a single high-speed channel 120 in two stages, only the second of which is based on frequency division multiplexing. In particular, 64 low-speed channels 240B are divided into 16 groups of 4 channels each. Within each group, the 4 channels are combined into a single signal using 16-QAM (quadrature amplitude modulation). The resulting QAM-modulated signals are frequency-division multiplexed to form the electrical high-speed channel.

As another example, it should be clear that the tributaries 160 may themselves be combinations of signals. For example, some or all of the OC-3/OC-12 tributaries 160 may be the result of combining several lower data rate signals, using either frequency division multiplexing or other techniques. In one approach, time division multiplexing may be used to combine several lower data rate signals into a single OC-3 signal, which serves as a tributary 160.

As a final example, frequency division multiplexing has been used in all of the preceding examples as the method for combining the low-speed channels 240 into a high-speed channel 120 for transmission across optical fiber 104. Other approaches could also be used. For example, the low-speed channels 240 could be combined using wavelength division multiplexing, in which the combining of channels occurs in the optical domain rather than in the electrical domain. Many of the principles described above may also be applied to the wavelength division multiplexing approach.

Although the invention has been described in considerable detail with reference to certain preferred embodiments thereof, other embodiments are possible. Therefore, the scope of the appended claims should not be limited to the description of the preferred embodiments contained herein.

What is claimed is:

1. In an optical fiber communications system, a method for maintaining jitter tolerance of data transmitted across the communications system, the method comprising:
    receiving a tributary complying with a jitter tolerance;
    recovering data from the tributary;
    receiving a reference clock;
    retiming the recovered data according to the reference clock;
    converting the recovered data into at least two intermediate-speed data channels, wherein each intermediate-speed data channel is timed by a first clock based on the reference clock;
    converting each intermediate-speed data channel into at least two low-speed data channels, wherein the low-speed data channels in aggregate contain the recovered data and each low-speed data channel is timed by a second clock based on the reference clock;
    modulating each low-speed data channel to generate a corresponding low-speed symbol channel; and
    frequency division multiplexing the low-speed symbol channels to produce an electrical high-speed channel for transmission in optical form across the communications system.

2. The method of claim 1 wherein the tributary and the jitter tolerance conform to a SONET protocol.

3. The method of claim 2 wherein each low-speed data channel includes:
    a framing header and a data rate which conforms to the SONET protocol; and
    a payload which does not conform to the SONET protocol.

4. The method of claim 3 wherein each low-speed data channel includes:
    a framing header and a data rate which conforms to the STS-3 protocol; and
    a payload which does not conform to the STS-3 protocol.

5. The method of claim 3 wherein each low-speed data channel includes:
    a framing header and a data rate which conforms to the STS-48 protocol; and
    a payload which does not conform to the STS-48 protocol.

6. The method of claim 1 wherein the step of converting the recovered data into at least two intermediate-speed data channels comprises:
    recovering a clock from the tributary;
    phase aligning the reference clock to the recovered clock;
    retiming the recovered data using the phase-aligned reference clock; and time division demultiplexing the retimed, recovered data into the intermediate-speed data channels.

7. The method of claim 6 wherein the step of converting each intermediate-speed data channel into at least two low-speed data channels comprises:
dividing the phase-aligned reference clock to produce the first clock;
retiming the recovered data in the intermediate-speed data channels using the first clock;
time division demultiplexing the intermediate-speed data channels into the low-speed data channels.

8. The method of claim 1 further comprising:
converting the electrical high-speed channel to an optical high-speed channel;
transmitting the optical high-speed channel across a fiber;
receiving the optical high-speed channel;
converting the received optical high-speed channel to a receive-side electrical high-speed channel;
frequency division demultiplexing the receive-side electrical high-speed channel into at least two receive-side low-speed symbol channels;
demodulating each receive-side low-speed symbol channel to generate a corresponding receive-side low-speed data channel;
recovering a clock and data from each receive-side low-speed data channel;
generating a receive-side reference clock synchronized to the receive-side recovered data;
converting the receive-side low-speed data channels into at least two receive-side intermediate-speed data channels; and
converting the receive-side intermediate-speed data channels into a receive-side tributary, wherein the receive-side tributary contains all of the receive-side recovered data, and the receive-side tributary is timed by a clock based on the receive-side reference clock and complies with the jitter tolerance.

9. The method of claim 8 wherein the tributary, the receive-side tributary and the jitter tolerance conform to a SONET protocol.

10. The method of claim 8 wherein the step of converting the receive-side low-speed data channels into at least two receive-side intermediate-speed data channels comprises:
storing the recovered data from each receive-side low-speed data channel;
aligning a timing for the receive-side low-speed data channels; and
time division multiplexing the receive-side recovered data from the receive-side low-speed data channels into the at least two receive-side intermediate-speed data channels according to the aligned timing.

11. The method of claim 10 wherein the step of converting the receive-side intermediate-speed data channels into the tributary comprises:
storing the recovered data from each receive-side intermediate-speed data channel;
aligning a timing for the receive-side intermediate-speed data channels; and
time division multiplexing the stored recovered data from the receive-side intermediate-speed data channels according to the aligned timing.

12. In an optical fiber communications system, a method for maintaining jitter tolerance of data transmitted across the communications system, the method comprising:
receiving an optical high-speed channel containing data transmitted across the communications system, the data from a tributary complying with a jitter tolerance before said transmission;
frequency division demultiplexing an electrical high-speed channel into at least two low-speed symbol channels, wherein the electrical high-speed channel is derived from the optical high-speed channel;
demodulating each low-speed symbol channel to generate a corresponding low-speed data channel;
recovering data from each low-speed data channel;
generating a reference clock synchronized to the recovered data;
storing the recovered data from each low-speed data channel;
aligning a timing for the low-speed data channels;
time division multiplexing the recovered data from the low-speed data channels into at least two intermediate-speed data channels according to the aligned timing;
aligning a timing for the intermediate-speed data channels; and
converting the intermediate-speed data channels into a tributary, wherein the tributary contains all of the recovered data, and the tributary is timed by a clock based on the reference clock and complies with the jitter tolerance.

13. The method of claim 12 wherein the tributary and the jitter tolerance conform to a SONET protocol.

14. The method of claim 13 wherein each low-speed data channel includes:
a framing header and a data rate which conforms to the SONET protocol; and
a payload which does not conform to the SONET protocol.

15. The method of claim 14 wherein each low-speed data channel includes:
a framing header and a data rate which conforms to the STS-3 protocol; and
a payload which does not conform to the STS-3 protocol.

16. The method of claim 14 wherein each low-speed data channel includes:
a framing header and a data rate which conforms to the STS-48 protocol; and
a payload which does not conform to the STS-48 protocol.

17. The method of claim 12 wherein the step of aligning a timing for the low-speed data channels comprises:
generating a framing pulse for each low-speed data channel; and
aligning the framing pulses.

18. The method of claim 12 wherein the step of converting the intermediate-speed data channels into the tributary comprises:
storing the recovered data from each intermediate-speed data channel;
aligning a timing for the intermediate-speed data channels; and
time division multiplexing the stored recovered data from the intermediate-speed data channels according to the aligned timing.

19. The method of claim 18 wherein the step of aligning a timing for the intermediate-speed data channels comprises:
generating a framing pulse for each intermediate-speed data channel; and
aligning the framing pulses.

20. An optical fiber communications system for maintaining jitter tolerance of data transmitted across the communications system, the communications system comprising:

a local oscillator for generating a reference clock conforming to a jitter tolerance;
a clock and data recovery circuitry coupled to the local oscillator for recovering data from a received tributary and for retiming the recovered data according to the reference clock;
a first time division demultiplexer coupled to the clock and data recovery circuitry for time division demultiplexing the recovered data into at least two intermediate-speed data channels, wherein each intermediate-speed data channel is timed by a first clock based on the reference clock;
a second time division demultiplexer coupled to the clock and data recovery circuitry for time division demultiplexing the intermediate-speed data channels into at least two low-speed data channels, wherein each low-speed data channel is timed by a second clock based on the reference clock;
a modulator coupled to the time division demultiplexer for modulating each low-speed data channel to generate a corresponding low-speed symbol channel; and
a frequency division multiplexer coupled to the modulator for frequency division multiplexing the low-speed symbol channels to produce an electrical high-speed channel for transmission in optical form across the communications system.

21. The communications system of claim 20 wherein the tributary and the jitter tolerance conform to a SONET protocol.

22. The communications system of claim 21 wherein each low-speed data channel includes:
a framing header and a data rate which conforms to the SONET protocol; and
a payload which does not conform to the SONET protocol.

23. The communications system of claim 22 wherein each low-speed data channel includes:
a framing header and a data rate which conforms to the STS-3 protocol; and
a payload which does not conform to the STS-3 protocol.

24. The communications system of claim 22 wherein each low-speed data channel includes:
a framing header and a data rate which conforms to the STS-48 protocol; and
a payload which does not conform to the STS-48 protocol.

25. The communications system of claim 20 further comprising:
an E/O converter coupled to the frequency division multiplexer for converting the electrical high-speed channel to an optical high-speed channel and for transmitting the optical high-speed channel across a fiber;
an O/E converter for receiving the optical high-speed channel and for converting the received optical high-speed channel to a receive-side electrical high-speed channel;
a frequency division demultiplexer coupled to the O/E converter for frequency division demultiplexing the receive-side electrical high-speed channel into at least two receive-side low-speed symbol channels;
a demodulator coupled to the frequency division demultiplexer for demodulating each receive-side low-speed symbol channel to generate a corresponding receive-side low-speed data channel;
a receive-side data recovery circuitry coupled to the demodulator for recovering data from each receive-side low-speed data channel;
a phase-locked loop coupled to the receive-side data recovery circuitry for generating a receive-side reference clock synchronized to the receive-side recovered data; and
a first time division multiplexer coupled to the receive-side data recovery circuitry and the phase-locked loop for generating at least two intermediate-speed data channels; and
a second time division multiplexer coupled to the first time division multiplexer for generating a receive-side tributary, wherein the receive-side tributary contains all of the receive-side recovered data, and the receive-side tributary is timed by a clock based on the receive-side reference clock and complies with the jitter tolerance.

26. The communications system of claim 25 wherein the tributary, the receive-side tributary and the jitter tolerance conform to a SONET protocol.

27. The communications system of claim 25
wherein the first time-division multiplexer comprises:
a state machine for aligning a timing for the receive-side intermediate-speed data channels;
buffers for storing the recovered data from each receive-side intermediate-speed data channel and releasing the stored recovered data according to the aligned timing; and
multiplexers for combining the released data; and
wherein the second time-division multiplexer comprises:
a state machine for aligning a timing for the receive-side low-speed data channels;
buffers for storing the recovered data from each receive-side low-speed data channel and releasing the stored recovered data according to the aligned timing; and
multiplexers for combining the released data.

28. An optical fiber communications system for maintaining jitter tolerance of data transmitted across the communications system, the communications system comprising:
a receiver for receiving an optical high-speed channel containing data transmitted across the communications system, the data from a tributary complying with a jitter tolerance before said transmission;
a frequency division demultiplexer coupled to the receiver for frequency division demultiplexing an electrical high-speed channel into at least two low-speed symbol channels, wherein the electrical high-speed channel is derived from the optical high-speed channel;
a demodulator coupled to the frequency division demultiplexer for demodulating each low-speed symbol channel to generate a corresponding low-speed data channel;
a clock and data recovery circuitry coupled to the demodulator for recovering data from each low-speed data channel and for generating a reference clock synchronized to the recovered data; and
a first time division multiplexer coupled to the clock and data recovery circuitry for generating at least two intermediate-speed data channels, wherein the first time division multiplexer comprises:
circuitry for aligning a timing according to the reference clock for the receive-side low-speed data channels;
circuitry for storing the recovered data from each receive-side low-speed data channel, and for releasing stored recovered data from the low-speed data channels according to the aligned timing; and
circuitry for combining the released data from the low-speed data channels;

wherein the intermediate-speed data channels are timed by a first clock based on the reference clock and comply with the jitter tolerance; and a second time division multiplexer coupled to the clock and data recovery circuitry for generating a tributary, wherein the tributary contains all of the recovered data, and the tributary is timed by a second clock based on the reference clock and complies with the jitter tolerance.

29. The communications system of claim 28 wherein the tributary and the jitter tolerance conform to a SONET protocol.

30. The communications system of claim 29 wherein each low-speed data channel includes:

a framing header and a data rate which conforms to the SONET protocol; and a payload which does not conform to the SONET protocol.

31. The communications system of claim 30 wherein each low-speed data channel includes:

a framing header and a data rate which conforms to the STS-3 protocol; and a payload which does not conform to the STS-3 protocol.

32. The communications system of claim 30 wherein each low-speed data channel includes:

a framing header and a data rate which conforms to the STS-48 protocol; and a payload which does not conform to the STS-48 protocol.

33. The communications system of claim 28 wherein the second time division multiplexer comprises:

a state machine for aligning a timing for the receive-side intermediate-speed data channels;

buffers for storing the recovered data from each receive-side intermediate-speed data channel and releasing the stored recovered data from the intermediate-speed data channels according to the aligned timing; and multiplexers for combining the released data from the intermediate-speed data channels.

* * * * *